United States Patent
Yan et al.

(10) Patent No.: US 10,568,075 B2
(45) Date of Patent: Feb. 18, 2020

(54) UPLINK CONTROL INFORMATION SENDING METHOD AND RECEIVING METHOD, AND RELATED APPARATUS

(71) Applicant: Huawei Technologies Co., Ltd., Shenzhen (CN)

(72) Inventors: Zhiyu Yan, Shenzhen (CN); Lei Guan, Beijing (CN); Yongxia Lyu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/888,996

(22) Filed: Feb. 5, 2018

(65) Prior Publication Data

US 2018/0160423 A1 Jun. 7, 2018

Related U.S. Application Data

(63) Continuation of application No. PCT/CN2015/087053, filed on Aug. 14, 2015.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0053* (2013.01); *H04W 72/1284* (2013.01); *H04W 88/02* (2013.01)

(58) Field of Classification Search
CPC ............. H04W 72/04; H04W 72/0413; H04W 72/1284; H04W 88/02; H04L 5/0048; H04L 5/0053; H04L 5/0057; H04L 5/001
See application file for complete search history.

(56) References Cited

U.S. PATENT DOCUMENTS 8,982,766 B2 * 3/2015 Kim ............... H04B 7/15528
    370/203
9,265,036 B2 * 2/2016 Sorrentino .............. H04L 5/001
(Continued)

FOREIGN PATENT DOCUMENTS

CN    101594683 A    12/2009
CN    101834658 A    9/2010
(Continued)

OTHER PUBLICATIONS

3GPP TS 36.212, 3rd Generation Parntership Project; Technical Specification Group Radio Access Network; Evolved Universal Terrestrial Radio Access (E-UTRA); Multiplexing and channel coding (Release 12); 94 pages, V12.5.0, Jun. 2015.
(Continued)

*Primary Examiner* — Khaled M Kassim
*Assistant Examiner* — Thomas R Cairns
(74) *Attorney, Agent, or Firm* — Slater Matsil, LLP

(57) ABSTRACT

Embodiments of the present invention provide a method, where a UE determines that uplink control information to be sent to an eNB in an uplink subframe includes channel state information (CSI) and a scheduling request (SR). The UE further determines a first uplink channel resource for sending the CSI and the SR to the eNB. The first uplink channel resource has an SR sending format and is used to send the CSI. The UE then sends the CSI and the SR to the eNB on the first uplink channel resource in the uplink subframe.

20 Claims, 14 Drawing Sheets

(51) Int. Cl.
*H04W 72/12* (2009.01)
*H04W 88/02* (2009.01)

(56) References Cited

U.S. PATENT DOCUMENTS

| | | | |
|---|---|---|---|
| 10,149,283 B2* | 12/2018 | Webb | H04L 5/0051 |
| 10,333,679 B2* | 6/2019 | Ahn | H04L 5/00 |
| 2010/0278109 A1 | 11/2010 | Papasakellariou et al. | |
| 2012/0113909 A1 | 5/2012 | Jen | |
| 2013/0100911 A1* | 4/2013 | Lv | H04L 1/0026 370/329 |
| 2013/0301571 A1 | 11/2013 | Sorrentino et al. | |
| 2014/0078942 A1 | 3/2014 | Noh et al. | |
| 2015/0009926 A1 | 1/2015 | Seo et al. | |
| 2015/0195817 A1 | 7/2015 | Sathananthan | |
| 2016/0302186 A1 | 10/2016 | Lv et al. | |
| 2019/0277943 A1* | 9/2019 | Morioka | G01S 5/0236 |

FOREIGN PATENT DOCUMENTS

| | | |
|---|---|---|
| CN | 101984568 A | 3/2011 |
| CN | 101986591 A | 3/2011 |
| CN | 102281133 A | 12/2011 |
| KR | 20150013757 A | 2/2015 |
| RU | 2546660 C1 | 4/2015 |
| WO | 2013115623 A1 | 8/2013 |

OTHER PUBLICATIONS

3GPP TS 36.213; 3rd Generation Partnership Project; Technical Specification Group Radio Access Network; Evolved Universal Terrestrial Radio Access (E-UTRA); Physical layer procedures (Release 12); 241 pages, V12.6.0, Jun. 2015.

* cited by examiner

UPLINK CONTROL INFORMATION SENDING METHOD AND RECEIVING METHOD, AND RELATED APPARATUS

CROSS-REFERENCE TO RELATED APPLICATIONS

This application is a continuation of International Application No. PCT/CN2015/087053, filed on Aug. 14, 2015, this disclosure of which is hereby incorporated by reference in its entirety.

TECHNICAL FIELD

Embodiments of the present invention relate to the communications field, and in particular, to an uplink control information sending method and receiving method, and a related apparatus.

BACKGROUND

Service transmission in a Long Term Evolution (LTE) system may be scheduled based on a base station (e.g., an eNodeB or eNB). A basic time unit for scheduling may be a subframe, and one subframe may include multiple time domain symbols. In a specific scheduling procedure, the base station may send control information on a control channel, such as a physical downlink control channel (PDCCH) or an enhanced physical downlink control channel (EPDCCH). The control channel may carry scheduling information of a physical downlink shared channel (PDSCH) or a physical uplink shared channel (PUSCH). Scheduling information may include control information such as resource allocation information and coding scheme adjustment. A user equipment (UE) detects the control channel in a subframe, and receives a downlink data channel or sends an uplink data channel according to the scheduling information carried in the detected control channel.

LTE supports a carrier aggregation (CA) technology, where an eNB configures multiple carriers for one UE to improve a data rate of the UE. In order for the eNB to perform scheduling for the UE and send downlink data to the UE on multiple downlink carriers, the UE may need to feed back channel state information (CSI) of the carriers to the eNB using a physical uplink control channel (PUCCH) resource or a PUSCH resource. Due to a format limitation of an uplink control channel, usually, the UE may feed back only periodic CSI that has a highest priority on a carrier. For periodic CSI of multiple downlink carriers that has a same priority, periodic CSI of a carrier that has a smallest downlink component carrier index may be fed back. In a particular uplink subframe, the eNB may configure that a scheduling request (SR) needs to be fed back in the uplink subframe, and the SR is used to request an uplink shared channel (UL-SCH) resource from the eNB.

In the prior art, it may be preconfigured that a UE does not support simultaneous sending of a PUCCH and a PUSCH; or it may be preconfigured that the UE supports simultaneous sending of a PUCCH and a PUSCH, but when no PUSCH is scheduled, periodic CSI may be discarded in cases when the periodic CSI and an SR need to be sent simultaneously in a same subframe, or when HARQ-ACK feedback information of a primary component carrier in multiple carriers needs to be sent in the same subframe, or when HARQ-ACK feedback information of carriers whose quantity is not greater than a preset quantity in the multiple carriers needs to be sent in the same subframe. Consequently, when the eNB configures a relatively large quantity of carriers, a large amount of periodic CSI information may be discarded, and thus periodic CSI information on a large quantity of carriers is lost, affecting accuracy of scheduling by the eNB for the UE.

SUMMARY

In view of this, embodiments of the present invention provide an uplink control information sending method and receiving method, and a related apparatus, to improve accuracy of resource scheduling by an eNB for a UE.

A first aspect of the embodiments of the present invention provides a user equipment (UE). The UE includes a processing module, configured to determine that uplink control information to be sent in an uplink subframe includes channel state information (CSI) and an SR, where the CSI is CSI of at least one of multiple carriers configured by a base station (eNB) for the UE. The processing module is further configured to determine a first uplink channel resource for the CSI, where the first uplink channel resource is a resource that is configured by the eNB for the UE and that is used to send the CSI. The UE further comprises a transceiver module, configured to send the CSI and the SR on the first uplink channel resource in the uplink subframe.

With reference to the first aspect of the embodiments of the present invention, in a first manner of the first aspect of the embodiments of the present invention, the CSI is periodic CSI, the first uplink channel resource is a physical uplink control channel (PUCCH) resource, and the PUCCH resource is a resource that has a first PUCCH format. The transceiver module is specifically configured to send the CSI and the SR on the PUCCH resource in the uplink subframe using the first PUCCH format.

With reference to the first implementation of the first aspect of the embodiments of the present invention, in a second manner of the first aspect of the embodiments of the present invention, a capacity of the first PUCCH format is greater than a preset bit quantity.

With reference to the second implementation of the first aspect of the embodiments of the present invention, in a third manner of the first aspect of the embodiments of the present invention, the preset bit quantity is 11.

With reference to any one of the first implementation of the first aspect, the second implementation of the first aspect, or the third implementation of the first aspect of the embodiments of the present invention, in a fourth manner of the first aspect of the embodiments of the present invention, the first PUCCH format is encoded using a convolutional code.

With reference to any one of the first implementation of the first aspect, the second implementation of the first aspect, the third implementation of the first aspect, or the fourth implementation of the first aspect of the embodiments of the present invention, in a fifth manner of the first aspect of the embodiments of the present invention, the transceiver module is specifically further configured to send the SR on a resource at a fixed location in the PUCCH resource in the uplink subframe using the first PUCCH format.

With reference to the fifth implementation of the first aspect of the embodiments of the present invention, in a sixth manner of the first aspect of the embodiments of the present invention, the resource at the fixed location in the PUCCH resource is one of a resource that is in the PUCCH resource and that is for a cyclic redundancy check (CRC) bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the first implementation of the first aspect, the second implementation of the first aspect, the third implementation of the first aspect, the fourth implementation of the first aspect, the fifth implementation of the first aspect, or the sixth implementation of the first aspect of the embodiments of the present invention, in a seventh manner of the first aspect of the embodiments of the present invention, the transceiver module is specifically further configured to, when the processing module determines that the eNB configures that a PUCCH and a PUSCH are not allowed to be sent simultaneously, or the processing module determines that the eNB configures that a PUCCH and a PUSCH are allowed to be sent simultaneously and no PUSCH is sent in the uplink subframe, send the CSI and the SR on the PUCCH resource in the uplink subframe using the first PUCCH format.

With reference to any one of the first implementation of the first aspect, the second implementation of the first aspect, the third implementation of the first aspect, the fourth implementation of the first aspect, the fifth implementation of the first aspect, or the sixth implementation of the first aspect of the embodiments of the present invention, in an eighth manner of the first aspect of the embodiments of the present invention, the processing module is further configured to determine a second uplink channel resource, where the second uplink channel resource is a resource that is configured by the eNB for the UE and that is used to send the SR. When the processing module determines that the first uplink channel resource is a PUCCH resource that has a second PUCCH format, the transceiver module is further configured to send the SR on the second uplink channel resource in the uplink subframe, where the second PUCCH format is a format that cannot be used to send the SR.

With reference to any one of the first implementation of the first aspect, the second implementation of the first aspect, the third implementation of the first aspect, the fourth implementation of the first aspect, the fifth implementation of the first aspect, the sixth implementation of the first aspect, or the seventh implementation of the first aspect of the embodiments of the present invention, in a ninth manner of the first aspect of the embodiments of the present invention, the processing module is further configured to determine a quantity of bits occupied by the CSI to be sent in the uplink subframe, a quantity of bits occupied by the SR to be sent in the uplink subframe, and a capacity $N_a$ of the PUCCH resource. The processing module is further configured to determine that a sum $N_1$ of the quantity of bits occupied by the CSI and the quantity of bits occupied by the SR is greater than the capacity $N_a$ of the PUCCH resource, and discard $N_2$ bits of CSI that has a low priority, where $N_2$ satisfies $N_1 - N_2 \leq N_a$.

With reference to the first aspect of the embodiments of the present invention, in a tenth manner of the first aspect of the embodiments of the present invention, the CSI is aperiodic CSI, the first uplink channel resource is a physical uplink shared channel (PUSCH) resource, and no uplink data information is to be sent on the PUSCH resource, and the transceiver module is specifically further configured to send the CSI and the SR on the PUSCH resource in the uplink subframe.

With reference to the tenth implementation of the first aspect of the embodiments of the present invention, in an eleventh manner of the first aspect of the embodiments of the present invention, the SR is sent on a resource at a first fixed location in the PUSCH resource.

With reference to the eleventh implementation of the first aspect of the embodiments of the present invention, in a twelfth manner of the first aspect of the embodiments of the present invention, the resource at the first fixed location is any one of a resource that is in the PUSCH resource and that is used for sending a CRC bit of CRC check coding before a target moment, where the target moment is a moment at which to-be-sent uplink control information is encoded, or a resource element at a preset location in the PUSCH resource, or a resource element that is preset in the PUSCH resource and that is used to carry a reference signal.

With reference to any one of the tenth implementation of the first aspect, the eleventh implementation of the first aspect, or the twelfth implementation of the first aspect of the embodiments of the present invention, in a thirteenth manner of the first aspect of the embodiments of the present invention, the transceiver module is specifically further configured to, when the processing module determines that the eNB configures that a PUCCH and a PUSCH are not allowed to be sent simultaneously, send the SR on the PUSCH resource.

With reference to any one of the tenth implementation of the first aspect, the eleventh implementation of the first aspect, the twelfth implementation of the first aspect, or the thirteenth implementation of the first aspect of the embodiments of the present invention, in a fourteenth manner of the first aspect of the embodiments of the present invention, the transceiver module is specifically further configured to, when the processing module determines that the uplink control information to be sent in the uplink subframe further includes a hybrid automatic repeat request acknowledgment (HARQ-ACK), send the CSI, the SR, and the HARQ-ACK information on the PUSCH resource in the uplink subframe.

With reference to the fourteenth implementation of the first aspect of the embodiments of the present invention, in a fifteenth manner of the first aspect of the embodiments of the present invention, a resource at a second fixed location is set in the PUSCH resource to send status information of the HARQ-ACK.

With reference to the fifteenth implementation of the first aspect of the embodiments of the present invention, in a sixteenth manner of the first aspect of the embodiments of the present invention, the resource at the second fixed location is a resource element at a preset location in the PUCCH resource.

With reference to any one of the tenth implementation of the first aspect, the eleventh implementation of the first aspect, the twelfth implementation of the first aspect, the thirteenth implementation of the first aspect, the fourteenth implementation of the first aspect, the fifteenth implementation of the first aspect, or the sixteenth implementation of the first aspect of the embodiments of the present invention, in a seventeenth manner of the first aspect of the embodiments of the present invention, the transceiver module is further configured to, when the processing module determines that it is configured that the SR is not allowed to be sent on the PUSCH resource, send the SR information on a second uplink channel resource, where the second uplink channel resource is a resource that is configured by the eNB for the UE and that is used to send the SR.

A second aspect of the embodiments of the present invention provides a user equipment (UE). The UE includes a processing module, configured to determine that uplink control information to be sent in an uplink subframe includes channel state information (CSI) and a hybrid automatic repeat request acknowledgment (HARQ-ACK), where the CSI is CSI of at least one of multiple carriers configured by a base station eNB for the UE, and the HARQ-ACK is acknowledgment information (ACK) or negative acknowledgment information (NACK) corresponding to a downlink data channel. The processing module is further configured to determine a first physical uplink control channel (PUCCH) resource for the CSI, where the first PUCCH resource is a PUCCH resource that has a first PUCCH format. The processing module is also configured to determine that the HARQ-ACK is feedback information of a primary component carrier in the multiple carriers, or the HARQ-ACK is feedback information of carriers whose quantity is not greater than a preset quantity in the multiple carriers. The UE further includes a transceiver module, configured to send the CSI and the HARQ-ACK on the first PUCCH resource in the uplink subframe using the first PUCCH format.

With reference to the second aspect of the embodiments of the present invention, in a first implementation of the second aspect of the embodiments of the present invention, a capacity of the first PUCCH format is greater than a preset bit quantity.

With reference to the first implementation of the second aspect of the embodiments of the present invention, in a second implementation of the second aspect of the embodiments of the present invention, the preset bit quantity is 11.

With reference to any one of the second aspect, the first implementation of the second aspect, or the second implementation of the second aspect of the embodiments of the present invention, in a third implementation of the second aspect of the embodiments of the present invention, the first PUCCH format is encoded using a convolutional code.

With reference to any one of the second aspect, the first implementation of the second aspect, the second implementation of the second aspect, or the third implementation of the second aspect of the embodiments of the present invention, in a fourth implementation of the second aspect of the embodiments of the present invention, a resource at a first fixed location in the PUCCH resource is used to send the HARQ-ACK.

With reference to the fourth implementation of the second aspect of the embodiments of the present invention, in a fifth implementation of the second aspect of the embodiments of the present invention, the resource at the first fixed location in the PUCCH resource includes a resource element at a preset location in the PUCCH resource.

With reference to any one of the second aspect, the first implementation of the second aspect, the second implementation of the second aspect, the third implementation of the second aspect, the fourth implementation of the second aspect, or the fifth implementation of the second aspect of the embodiments of the present invention, in a sixth implementation of the second aspect of the embodiments of the present invention, the processing module is further configured to obtain configuration information, where the configuration information is used to indicate that the UE is allowed to send the CSI and the HARQ-ACK on the first PUCCH resource that has the first PUCCH format.

With reference to any one of the second aspect, the first implementation of the second aspect, the second implementation of the second aspect, the third implementation of the second aspect, the fourth implementation of the second aspect, the fifth implementation of the second aspect, or the sixth implementation of the second aspect of the embodiments of the present invention, in a seventh implementation of the second aspect of the embodiments of the present invention, the transceiver module is specifically further configured to, when the processing module determines that the eNB configures that a PUCCH and a PUSCH are not allowed to be sent simultaneously, or when the processing module determines that the eNB configures that a PUCCH and a PUSCH are allowed to be sent simultaneously and no PUSCH is sent in the uplink subframe, send the CSI and the HARQ-ACK on the PUCCH resource in the uplink subframe using the first PUCCH format.

With reference to any one of the second aspect, the first implementation of the second aspect, the second implementation of the second aspect, the third implementation of the second aspect, the fourth implementation of the second aspect, the fifth implementation of the second aspect, the sixth implementation of the second aspect, or the seventh implementation of the second aspect of the embodiments of the present invention, in an eighth implementation of the second aspect of the embodiments of the present invention, the processing module is further configured to determine a quantity of bits occupied by the CSI to be sent in the uplink subframe, a quantity of bits occupied by the HARQ-ACK to be sent in the uplink subframe, and a capacity $M_a$ of the PUCCH resource, determine that a sum $M_1$ of the quantity of bits occupied by the CSI and the quantity of bits occupied by the HARQ-ACK is greater than the capacity $M_a$ of the PUCCH, and discard $M_2$ bits of CSI that has a low priority, where $M_2$ satisfies $M_1-M_2 \leq M_a$.

With reference to the second aspect of the embodiments of the present invention, in a ninth implementation of the second aspect of the embodiments of the present invention, the transceiver module is specifically further configured to, when the processing module determines that the uplink control information to be sent in the uplink subframe further includes an SR, send the CSI, the HARQ-ACK, and the SR on the PUCCH resource.

With reference to the ninth implementation of the second aspect of the embodiments of the present invention, in a tenth implementation of the second aspect of the embodiments of the present invention, a resource at a second fixed location in the PUCCH resource is used to send the SR.

With reference to the tenth implementation of the second aspect of the embodiments of the present invention, in an eleventh implementation of the second aspect of the embodiments of the present invention, the resource at the second fixed location in the PUCCH resource is one of a resource that is in the PUCCH resource and that is used for sending a CRC bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the ninth implementation of the second aspect, the tenth implementation of the second aspect, or the eleventh implementation of the second aspect of the embodiments of the present invention, in a twelfth implementation of the second aspect of the embodiments of the present invention, the transceiver module is specifically further configured to, when the processing module determines that the eNB configures that a PUCCH and a PUSCH resource are not allowed to be sent simultaneously, or the processing module determines that the eNB configures that a PUCCH and a PUSCH are allowed to be sent simultaneously and that no PUSCH is sent in the uplink subframe, send the CSI, the HARQ-ACK, and the SR on the PUCCH resource in the uplink subframe using the first PUCCH format.

With reference to any one of the ninth implementation of the second aspect, the tenth implementation of the second aspect, the eleventh implementation of the second aspect, or the twelfth implementation of the second aspect of the embodiments of the present invention, in a thirteenth implementation of the second aspect of the embodiments of the present invention, the processing module is specifically further configured to determine a quantity of bits occupied by the CSI to be sent in the uplink subframe, a quantity of bits occupied by the HARQ-ACK to be sent in the uplink subframe, a quantity of bits occupied by the SR to be sent in the uplink subframe, and a capacity $Y_a$ of the PUCCH resource. The processing module is also configured to determine that a sum $Y_1$ of the quantity of bits occupied by the CSI, the quantity of bits occupied by the HARQ-ACK, and the quantity of bits occupied by the SR is greater than the capacity $Y_a$ of the PUCCH resource, and discard $Y_2$ bits of CSI that has a low priority, where $Y_2$ satisfies $Y_1-Y_2 \leq Y_a$.

A third aspect of the embodiments of the present invention provides an eNB. The eNB includes a processing module, configured to determine that uplink control information to be sent by user equipment UE in an uplink subframe includes channel state information (CSI) and an SR, where the CSI is CSI of at least one of multiple carriers configured by the base station eNB for the UE. The processing module is further configured to determine a first uplink channel resource that is used by the UE to send the CSI in the uplink subframe. The eNB further includes a transceiver module, configured to receive the CSI and the SR that are sent by the UE on the first uplink channel resource in the uplink subframe.

With reference to the third aspect of the embodiments of the present invention, in a first manner of the third aspect of the embodiments of the present invention, the CSI is periodic CSI, the first uplink channel resource is a physical uplink control channel (PUCCH) resource, and the PUCCH resource is a resource that has a first PUCCH format. The transceiver module is specifically configured to receive the CSI and the SR that are sent by the UE on the PUCCH resource in the uplink subframe using the first PUCCH format.

With reference to the first implementation of the third aspect of the embodiments of the present invention, in a second manner of the third aspect of the embodiments of the present invention, a capacity of the first PUCCH format is greater than a preset bit quantity.

With reference to the second implementation of the third aspect of the embodiments of the present invention, in a third manner of the third aspect of the embodiments of the present invention, the preset bit quantity is 11.

With reference to any one of the first implementation of the third aspect, the second implementation of the third aspect, or the third implementation of the third aspect of the embodiments of the present invention, in a fourth manner of the third aspect of the embodiments of the present invention, the first PUCCH format is encoded using a convolutional code.

With reference to any one of the first implementation of the third aspect, the second implementation of the third aspect, the third implementation of the third aspect, or the fourth implementation of the third aspect of the embodiments of the present invention, in a fifth manner of the third aspect of the embodiments of the present invention, the transceiver module is specifically further configured to receive the SR that is sent by the UE on a resource at a fixed location in the PUCCH resource in the uplink subframe using the first PUCCH format.

With reference to the fifth implementation of the third aspect of the embodiments of the present invention, in a sixth manner of the third aspect of the embodiments of the present invention, the resource at the fixed location in the PUCCH resource is one of a resource that is in the PUCCH resource and that is for a CRC bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the first implementation of the third aspect, the second implementation of the third aspect, the third implementation of the third aspect, the fourth implementation of the third aspect, the fifth implementation of the third aspect, or the sixth implementation of the third aspect of the embodiments of the present invention, in a seventh manner of the third aspect of the embodiments of the present invention, the transceiver module is specifically further configured to, when the processing module configures that the UE is not allowed to send a PUCCH and a PUSCH simultaneously, or the processing module configures that the UE is allowed to send a PUCCH and a PUSCH simultaneously and the UE determines that no PUSCH is sent in the uplink subframe, receive the CSI and the SR that are sent by the UE on the first uplink channel resource in the uplink subframe.

With reference to any one of the first implementation of the third aspect, the second implementation of the third aspect, the third implementation of the third aspect, the fourth implementation of the third aspect, the fifth implementation of the third aspect, or the sixth implementation of the third aspect of the embodiments of the present invention, in an eighth manner of the third aspect of the embodiments of the present invention, the processing module is specifically further configured to configure a second uplink channel resource for the UE, where the second uplink channel resource is a resource that is used by the UE to send the SR. When the second uplink channel resource is a resource that has a second PUCCH format, the transceiver module is further configured to receive the SR that is sent by the UE on the second uplink channel resource in the uplink subframe, where the second PUCCH format is a format that cannot be used to send the SR.

With reference to the third aspect of the embodiments of the present invention, in a ninth manner of the third aspect of the embodiments of the present invention, the CSI is aperiodic CSI, the first uplink channel resource is a physical uplink shared channel (PUSCH) resource, and no uplink data information is to be sent on the PUSCH resource. The transceiver module is specifically further configured to receive the CSI and the SR that are sent by the UE on the PUSCH resource in the uplink subframe.

With reference to the ninth implementation of the third aspect of the embodiments of the present invention, in a tenth manner of the third aspect of the embodiments of the present invention, the SR is sent on a resource at a first fixed location in the PUSCH resource.

With reference to the tenth implementation of the third aspect of the embodiments of the present invention, in an eleventh manner of the third aspect of the embodiments of the present invention, the resource at the first fixed location is any one of a resource that is in the PUSCH resource and that is used for sending a CRC bit of CRC check coding before a target moment, where the target moment is a moment at which to-be-sent uplink control information is encoded, or a resource element at a preset location in the PUSCH resource, or a resource element that is preset in the PUSCH resource and that is used to carry a reference signal.

With reference to any one of the ninth implementation of the third aspect, the tenth implementation of the third aspect, or the eleventh implementation of the third aspect of the embodiments of the present invention, in a twelfth manner of the third aspect of the embodiments of the present invention, the transceiver module is specifically further configured to, when the processing module configures that the UE is not allowed to send a PUCCH and a PUSCH simultaneously, receive the SR that is sent by the UE on the PUSCH resource.

With reference to any one of the ninth implementation of the third aspect, the tenth implementation of the third aspect, the eleventh implementation of the third aspect, or the twelfth implementation of the third aspect of the embodiments of the present invention, in a thirteenth manner of the third aspect of the embodiments of the present invention, the transceiver module is specifically further configured to, when the UE determines that the uplink control information to be sent in the uplink subframe further includes a hybrid automatic repeat request acknowledgment (HARQ-ACK), receive the CSI, the SR, and the HARQ-ACK information that are sent by the UE on the PUSCH resource in the uplink subframe.

With reference to the thirteenth implementation of the third aspect of the embodiments of the present invention, in a fourteenth manner of the third aspect of the embodiments of the present invention, a resource at a second fixed location is set in the PUSCH resource to send status information of the HARQ-ACK.

With reference to the fourteenth implementation of the third aspect of the embodiments of the present invention, in a fifteenth manner of the third aspect of the embodiments of the present invention, the resource at the second fixed location is a resource element at a preset location in the PUCCH resource.

With reference to any one of the ninth implementation of the third aspect, the tenth implementation of the third aspect, the eleventh implementation of the third aspect, the twelfth implementation of the third aspect, the thirteenth manner of the third aspect, the fourteenth implementation of the third aspect, or the fifteenth implementation of the third aspect of the embodiments of the present invention, in a sixteenth manner of the third aspect of the embodiments of the present invention, the processing module is specifically further configured to configure a second uplink channel resource for the UE, where the second uplink channel resource is a resource that is configured by the eNB for the UE and that is used to send the SR. The processing module is further configured to, when the processing module configures that the UE is not allowed to send the SR on the PUSCH resource, receive the SR information that is sent by the UE on the second uplink channel resource.

A fourth aspect of the embodiments of the present invention provides an eNB. The eNB includes a processing module, configured to determine that uplink control information to be sent by user equipment UE in an uplink subframe includes channel state information (CSI) and a hybrid automatic repeat request acknowledgment (HARQ-ACK), where the CSI is CSI of at least one of multiple carriers configured by the network device for the UE, and the HARQ-ACK is acknowledgment information (ACK) or negative acknowledgment information (NACK) corresponding to a downlink data channel. The processing module is further configured to determine a first physical uplink control channel (PUCCH) resource that is used by the UE to send the CSI in the uplink subframe, where the first PUCCH resource is a PUCCH resource that has a first PUCCH format. The processing module is further configured to determine that the HARQ-ACK is feedback information of a primary component carrier in the multiple carriers, or the HARQ-ACK is feedback information of carriers whose quantity is not greater than a preset quantity in the multiple carriers. The eNB further includes a transceiver module, configured to receive the CSI and the HARQ-ACK that are sent by the UE on the PUCCH resource in the uplink subframe using the first PUCCH format.

With reference to the fourth aspect of the embodiments of the present invention, in a first implementation of the fourth aspect of the embodiments of the present invention, a capacity of the first PUCCH format is greater than a preset bit quantity.

With reference to the first implementation of the fourth aspect of the embodiments of the present invention, in a second implementation of the fourth aspect of the embodiments of the present invention, the preset bit quantity is 11.

With reference to any one of the fourth aspect, the first implementation of the fourth aspect, or the second implementation of the fourth aspect of the embodiments of the present invention, in a third implementation of the fourth aspect of the embodiments of the present invention, the first PUCCH format is encoded using a convolutional code.

With reference to any one of the fourth aspect, the first implementation of the fourth aspect, the second implementation of the fourth aspect, or the third implementation of the fourth aspect of the embodiments of the present invention, in a fourth implementation of the fourth aspect of the embodiments of the present invention, a resource at a first fixed location in the PUCCH resource that has the first PUCCH format is used to send status information of the HARQ-ACK.

With reference to the fourth implementation of the fourth aspect of the embodiments of the present invention, in a fifth implementation of the fourth aspect of the embodiments of the present invention, the resource at the first fixed location in the PUCCH resource includes a resource element at a preset location in the PUCCH resource.

With reference to any one of the fourth aspect, the first implementation of the fourth aspect, the second implementation of the fourth aspect, the third implementation of the fourth aspect, the fourth implementation of the fourth aspect, or the fifth implementation of the fourth aspect of the embodiments of the present invention, in a sixth implementation of the fourth aspect of the embodiments of the present invention, the transceiver module is specifically further configured to send configuration information to the UE, where the configuration information is used to indicate that the UE is allowed to send the CSI and the HARQ-ACK on the physical uplink control channel PUCCH resource that has the first PUCCH format.

With reference to any one of the fourth aspect, the first implementation of the fourth aspect, the second implementation of the fourth aspect, the third implementation of the fourth aspect, the fourth implementation of the fourth aspect, the fifth implementation of the fourth aspect, or the sixth implementation of the fourth aspect of the embodiments of the present invention, in a seventh implementation of the fourth aspect of the embodiments of the present invention, the transceiver module is specifically further configured to, when the processing module configures that the UE is not allowed to send a PUCCH and a PUSCH simultaneously, or when the processing module configures that the UE is allowed to send a PUCCH and a PUSCH simultaneously and the UE determines that no PUSCH is sent in the uplink subframe, receive the CSI and the HARQ-ACK that are sent by the UE on the PUCCH resource in the uplink subframe using the first PUCCH format.

With reference to the fourth aspect of the embodiments of the present invention, in an eighth implementation of the fourth aspect of the embodiments of the present invention, the transceiver module is specifically further configured to, when the UE determines that the uplink control information to be sent in the uplink subframe further includes an SR, receive the CSI, the HARQ-ACK, and the SR that are sent by the UE on the PUCCH resource.

With reference to the eighth implementation of the fourth aspect of the embodiments of the present invention, in a ninth implementation of the fourth aspect of the embodiments of the present invention, a resource at a second fixed location in the PUCCH resource is used to send the SR.

With reference to the ninth implementation of the fourth aspect of the embodiments of the present invention, in a tenth implementation of the fourth aspect of the embodiments of the present invention, the resource at the second fixed location in the PUCCH resource is one of a resource that is in the PUCCH resource and that is used for sending a CRC bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the eighth implementation of the fourth aspect, the ninth implementation of the fourth aspect, or the tenth implementation of the fourth aspect of the embodiments of the present invention, in an eleventh implementation of the fourth aspect of the embodiments of the present invention, the transceiver module is specifically further configured to, when the processing module configures that the UE is not allowed to send a PUCCH and a PUSCH resource simultaneously, or the processing module configures that the UE is allowed to send a PUCCH and a PUSCH simultaneously and the UE determines that no PUSCH is sent in the uplink subframe, receive the CSI, the HARQ-ACK, and the SR that are sent by the UE on the PUCCH resource in the uplink subframe using the first PUCCH format.

A fifth aspect of the embodiments of the present invention provides an uplink control information sending method. The method includes determining, by a user equipment (UE), that uplink control information to be sent in an uplink subframe includes channel state information (CSI) and an SR, where the CSI is CSI of at least one of multiple carriers configured by an eNB for the UE. The method further includes determining, by the UE, a first uplink channel resource for the CSI, where the first uplink channel resource is a resource that is configured by the eNB for the UE and that is used to send the CSI. The method also includes sending, by the UE, the CSI and the SR on the first uplink channel resource in the uplink subframe.

With reference to the fifth aspect of the embodiments of the present invention, in a first manner of the fifth aspect of the embodiments of the present invention, the CSI is periodic CSI, the first uplink channel resource is a physical uplink control channel (PUCCH) resource, and the PUCCH resource is a resource that has a first PUCCH format. Sending, by the UE, the CSI and the SR on the first uplink channel resource in the uplink subframe includes sending, by the UE, the CSI and the SR on the PUCCH resource in the uplink subframe using the first PUCCH format.

With reference to the first implementation of the fifth aspect of the embodiments of the present invention, in a second manner of the fifth aspect of the embodiments of the present invention, a capacity of the first PUCCH format is greater than a preset bit quantity.

With reference to the second implementation of the fifth aspect of the embodiments of the present invention, in a third manner of the fifth aspect of the embodiments of the present invention, the preset bit quantity is 11.

With reference to any one of the first implementation of the fifth aspect, the second implementation of the fifth aspect, or the third implementation of the fifth aspect of the embodiments of the present invention, in a fourth manner of the fifth aspect of the embodiments of the present invention, the first PUCCH format is encoded using a convolutional code.

With reference to any one of the first implementation of the fifth aspect, the second implementation of the fifth aspect, the third implementation of the fifth aspect, or the fourth implementation of the fifth aspect of the embodiments of the present invention, in a fifth manner of the fifth aspect of the embodiments of the present invention, sending, by the UE, the SR on the PUCCH resource in the uplink subframe using the first PUCCH format includes sending, by the UE, the SR on a resource at a fixed location in the PUCCH resource in the uplink subframe using the first PUCCH format.

With reference to the fifth implementation of the fifth aspect of the embodiments of the present invention, in a sixth manner of the fifth aspect of the embodiments of the present invention, the resource at the fixed location in the PUCCH resource is one of a resource that is in the PUCCH resource and that is for a CRC bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the first implementation of the fifth aspect, the second implementation of the fifth aspect, the third implementation of the fifth aspect, the fourth implementation of the fifth aspect, the fifth implementation of the fifth aspect, or the sixth implementation of the fifth aspect of the embodiments of the present invention, in a seventh manner of the fifth aspect of the embodiments of the present invention, sending, by the UE, the CSI and the SR on the PUCCH resource in the uplink subframe using the first PUCCH format includes, when the UE determines that the eNB configures that a PUCCH and a PUSCH are not allowed to be sent simultaneously, or the UE determines that the eNB configures that a PUCCH and a PUSCH are allowed to be sent simultaneously and that no PUSCH is sent in the uplink subframe, sending, by the UE, the CSI and the SR on the PUCCH resource in the uplink subframe using the first PUCCH format.

With reference to any one of the first implementation of the fifth aspect, the second implementation of the fifth aspect, the third implementation of the fifth aspect, the fourth implementation of the fifth aspect, the fifth implementation of the fifth aspect, or the sixth implementation of the fifth aspect of the embodiments of the present invention, in an eighth manner of the fifth aspect of the embodiments of the present invention, the method further includes determining, by the UE, a second uplink channel resource, where the second uplink channel resource is a resource that is configured by the eNB for the UE and that is used to send the SR. The method also includes, when the UE determines that the first uplink channel resource is a PUCCH resource that has a second PUCCH format, sending, by the UE, the SR on the second uplink channel resource in the uplink subframe, where the second PUCCH format is a format that cannot be used to send the SR.

With reference to any one of the first implementation of the fifth aspect, the second implementation of the fifth aspect, the third implementation of the fifth aspect, the fourth implementation of the fifth aspect, the fifth implementation of the fifth aspect, the sixth implementation of the fifth aspect, or the seventh implementation of the fifth aspect of the embodiments of the present invention, in a ninth manner of the fifth aspect of the embodiments of the present invention, the method further includes determining, by the UE, a quantity of bits occupied by the CSI to be sent in the uplink subframe, a quantity of bits occupied by the SR to be sent in the uplink subframe, and a capacity $N_a$ of the PUCCH resource, determining, by the UE, that a sum $N_1$ of the quantity of bits occupied by the CSI and the quantity of bits occupied by the SR is greater than the capacity $N_a$ of the PUCCH resource, and discarding $N_2$ bits of CSI that has a low priority, where $N_2$ satisfies $N_1-N_2 \le N_a$.

With reference to the fifth aspect of the embodiments of the present invention, in a tenth manner of the fifth aspect of the embodiments of the present invention, the CSI is aperiodic CSI, the first uplink channel resource is a PUSCH resource, and no uplink data information is to be sent on the PUSCH resource. Sending, by the UE, the CSI and the SR on the first uplink channel resource in the uplink subframe includes sending, by the UE, the CSI and the SR on the PUSCH resource in the uplink subframe.

With reference to the tenth implementation of the fifth aspect of the embodiments of the present invention, in an eleventh manner of the fifth aspect of the embodiments of the present invention, the SR is sent on a resource at a first fixed location in the PUSCH resource.

With reference to the eleventh implementation of the fifth aspect of the embodiments of the present invention, in a twelfth manner of the fifth aspect of the embodiments of the present invention, the resource at the first fixed location is any one of a resource that is in the PUSCH resource and that is used for sending a CRC bit of CRC check coding before a target moment, where the target moment is a moment at which the to-be-sent uplink control information is encoded, or a resource element at a preset location in the PUSCH resource, or a resource element that is preset in the PUSCH resource and that is used to carry a reference signal.

With reference to any one of the tenth implementation of the fifth aspect, the eleventh implementation of the fifth aspect, or the twelfth implementation of the fifth aspect of the embodiments of the present invention, in a thirteenth manner of the fifth aspect of the embodiments of the present invention, sending, by the UE, the SR on the PUSCH resource includes, when the UE determines that the eNB configures that a PUCCH and a PUSCH are not allowed to be sent simultaneously, sending, by the UE, the SR on the PUSCH resource.

With reference to any one of the tenth implementation of the fifth aspect, the eleventh implementation of the fifth aspect, the twelfth implementation of the fifth aspect, or the thirteenth implementation of the fifth aspect of the embodiments of the present invention, in a fourteenth manner of the fifth aspect of the embodiments of the present invention, sending, by the UE, the SR on the PUSCH resource includes, when the UE determines that the uplink control information to be sent in the uplink subframe further includes a hybrid automatic repeat request acknowledgment (HARQ-ACK), sending, by the UE, the CSI, the SR, and the HARQ-ACK information on the PUSCH resource in the uplink subframe.

With reference to the fourteenth implementation of the fifth aspect of the embodiments of the present invention, in a fifteenth manner of the fifth aspect of the embodiments of the present invention, a resource at a second fixed location is set in the PUSCH resource to send status information of the HARQ-ACK.

With reference to the fifteenth implementation of the fifth aspect of the embodiments of the present invention, in a sixteenth manner of the fifth aspect of the embodiments of the present invention, the resource at the second fixed location is a resource element at a preset location in the PUCCH resource.

With reference to any one of the tenth implementation of the fifth aspect, the eleventh implementation of the fifth aspect, the twelfth implementation of the fifth aspect, the thirteenth implementation of the fifth aspect, the fourteenth implementation of the fifth aspect, the fifteenth implementation of the fifth aspect, or the sixteenth implementation of the fifth aspect of the embodiments of the present invention, in a seventeenth manner of the fifth aspect of the embodiments of the present invention, the method further includes, when the UE determines that it is configured that the SR is not allowed to be sent on the PUSCH resource, sending, by the UE, the SR information on a second uplink channel resource, where the second uplink channel resource is a resource that is configured by the eNB for the UE and that is used to send the SR.

A sixth aspect of the embodiments of the present invention provides an uplink control information sending method. The method includes determining, by a user equipment (UE), that uplink control information to be sent in an uplink subframe includes channel state information (CSI) and a hybrid automatic repeat request acknowledgment (HARQ-ACK), where the CSI is CSI of at least one of multiple carriers configured by an eNB for the UE, and the HARQ-ACK is acknowledgment information (ACK) or negative acknowledgment information (NACK) corresponding to a downlink data channel. The method further includes determining, by the UE, a first physical uplink control channel (PUCCH) resource for the CSI, where the first PUCCH resource is a PUCCH resource that has a first PUCCH format, and determining, by the UE, that the HARQ-ACK is feedback information of a primary component carrier in the multiple carriers, or the HARQ-ACK is feedback information of carriers whose quantity is not greater than a preset quantity in the multiple carriers. The method also includes sending, by the UE, the CSI and the HARQ-ACK on the first PUCCH resource in the uplink subframe using the first PUCCH format.

With reference to the sixth aspect of the embodiments of the present invention, in a first implementation of the sixth aspect of the embodiments of the present invention, a capacity of the first PUCCH format is greater than a preset bit quantity.

With reference to the first implementation of the sixth aspect of the embodiments of the present invention, in a second implementation of the sixth aspect of the embodiments of the present invention, the preset bit quantity is 11.

With reference to any one of the sixth aspect, the first implementation of the sixth aspect, or the second implementation of the sixth aspect of the embodiments of the present invention, in a third implementation of the sixth aspect of the embodiments of the present invention, the first PUCCH format is encoded using a convolutional code.

With reference to any one of the sixth aspect, the first implementation of the sixth aspect, the second implementation of the sixth aspect, or the third implementation of the sixth aspect of the embodiments of the present invention, in a fourth implementation of the sixth aspect of the embodiments of the present invention, a resource at a first fixed location in the PUCCH resource is used to send the HARQ-ACK.

With reference to the fourth implementation of the sixth aspect of the embodiments of the present invention, in a fifth implementation of the sixth aspect of the embodiments of the present invention, the resource at the first fixed location in the PUCCH resource includes a resource element at a preset location in the PUCCH resource.

With reference to any one of the sixth aspect, the first implementation of the sixth aspect, the second implementation of the sixth aspect, the third implementation of the sixth aspect, the fourth implementation of the sixth aspect, or the fifth implementation of the sixth aspect of the embodiments of the present invention, in a sixth implementation of the sixth aspect of the embodiments of the present invention, the method further includes obtaining, by the UE, configuration information, where the configuration information is used to indicate that the UE is allowed to send the CSI and the HARQ-ACK on the first PUCCH resource that has the first PUCCH format.

With reference to any one of the sixth aspect, the first implementation of the sixth aspect, the second implementation of the sixth aspect, the third implementation of the sixth aspect, the fourth implementation of the sixth aspect, the fifth implementation of the sixth aspect, or the sixth implementation of the sixth aspect of the embodiments of the present invention, in a seventh implementation of the sixth aspect of the embodiments of the present invention, sending, by the UE, the CSI and the HARQ-ACK on the PUCCH resource in the uplink subframe using the first PUCCH format includes, when the UE determines that the eNB configures that a PUCCH and a PUSCH are not allowed to be sent simultaneously, or when the UE determines that the eNB configures that a PUCCH and a PUSCH are allowed to be sent simultaneously and that no PUSCH is sent in the uplink subframe, sending, by the UE, the CSI and the HARQ-ACK on the PUCCH resource in the uplink subframe using the first PUCCH format.

With reference to any one of the sixth aspect, the first implementation of the sixth aspect, the second implementation of the sixth aspect, the third implementation of the sixth aspect, the fourth implementation of the sixth aspect, the fifth implementation of the sixth aspect, the sixth implementation of the sixth aspect, or the seventh implementation of the sixth aspect of the embodiments of the present invention, in an eighth implementation of the sixth aspect of the embodiments of the present invention, the method further includes determining, by the UE, a quantity of bits occupied by the CSI to be sent in the uplink subframe, a quantity of bits occupied by the HARQ-ACK to be sent in the uplink subframe, and a capacity $M_a$ of the PUCCH resource, determining, by the UE, that a sum $M_1$ of the quantity of bits occupied by the CSI and the quantity of bits occupied by the HARQ-ACK is greater than the capacity $M_a$ of the PUCCH, and discarding $M_2$ bits of CSI that has a low priority, where $M_2$ satisfies $M_1-M_2 \leq M_a$.

With reference to the sixth aspect of the embodiments of the present invention, in a ninth implementation of the sixth aspect of the embodiments of the present invention, sending, by the UE, the CSI and the HARQ-ACK on the PUCCH resource in the uplink subframe using the first PUCCH format includes, when the UE determines that the uplink control information to be sent in the uplink subframe further includes an SR, sending, by the UE, the CSI, the HARQ-ACK, and the SR on the PUCCH resource.

With reference to the ninth implementation of the sixth aspect of the embodiments of the present invention, in a tenth implementation of the sixth aspect of the embodiments of the present invention, a resource at a second fixed location in the PUCCH resource is used to send the SR.

With reference to the tenth implementation of the sixth aspect of the embodiments of the present invention, in an eleventh implementation of the sixth aspect of the embodiments of the present invention, the resource at the second fixed location in the PUCCH resource is one of a resource that is in the PUCCH resource and that is used for sending a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal.

With reference to any one of the ninth implementation of the sixth aspect, the tenth implementation of the sixth aspect, or the eleventh implementation of the sixth aspect of the embodiments of the present invention, in a twelfth implementation of the sixth aspect of the embodiments of the present invention, sending, by the UE, the CSI, the HARQ-ACK, and the SR on the PUCCH resource includes, when the UE determines that the eNB configures that a PUCCH and a PUSCH resource are not allowed to be sent simultaneously, or the UE determines that the eNB configures that a PUCCH and a PUSCH are allowed to be sent simultaneously and that no PUSCH is sent in the uplink subframe, sending, by the UE, the CSI, the HARQ-ACK, and the SR on the PUCCH resource in the uplink subframe using the first PUCCH format.

With reference to any one of the ninth implementation of the sixth aspect, the tenth implementation of the sixth aspect, the eleventh implementation of the sixth aspect, or the twelfth implementation of the sixth aspect of the embodiments of the present invention, in a thirteenth implementation of the sixth aspect of the embodiments of the present invention, the method further includes determining, by the UE, a quantity of bits occupied by the CSI to be sent in the uplink subframe, a quantity of bits occupied by the HARQ-ACK to be sent in the uplink subframe, a quantity of bits occupied by the SR to be sent in the uplink subframe, and a capacity $Y_a$ of the PUCCH resource, determining, by the UE, that a sum $Y_1$ of the quantity of bits occupied by the CSI, the quantity of bits occupied by the HARQ-ACK, and the quantity of bits occupied by the SR is greater than the capacity $Y_a$ of the PUCCH resource, and discarding $Y_2$ bits of CSI that has a low priority, where $Y_2$ satisfies $Y_1-Y_2 \leq Y_a$.

A seventh aspect of the embodiments of the present invention provides an uplink control information receiving method. The method includes determining, by an eNB, that uplink control information to be sent by a user equipment (UE) in an uplink subframe includes channel state information (CSI) and an SR, where the CSI is CSI of at least one of multiple carriers configured by the base station eNB for the UE. The method further includes determining, by the eNB, a first uplink channel resource that is used by the UE to send the CSI in the uplink subframe, and receiving, by the eNB, the CSI and the SR that are sent by the UE on the first uplink channel resource in the uplink subframe.

With reference to the seventh aspect of the embodiments of the present invention, in a first manner of the seventh aspect of the embodiments of the present invention, the CSI is periodic CSI, the first uplink channel resource is a physical uplink control channel (PUCCH) resource, and the PUCCH resource is a resource that has a first PUCCH format. Receiving, by the eNB, the CSI and the SR that are sent by the UE on the first uplink channel resource in the uplink subframe includes receiving, by the eNB, the CSI and the SR that are sent by the UE on the PUCCH resource in the uplink subframe using the first PUCCH format.

With reference to the first implementation of the seventh aspect of the embodiments of the present invention, in a second manner of the seventh aspect of the embodiments of the present invention, a capacity of the first PUCCH format is greater than a preset bit quantity.

With reference to the second implementation of the seventh aspect of the embodiments of the present invention, in a third manner of the seventh aspect of the embodiments of the present invention, the preset bit quantity is 11.

With reference to any one of the first implementation of the seventh aspect, the second implementation of the seventh aspect, or the third implementation of the seventh aspect of the embodiments of the present invention, in a fourth manner of the seventh aspect of the embodiments of the present invention, the first PUCCH format is encoded using a convolutional code.

With reference to any one of the first implementation of the seventh aspect, the second implementation of the seventh aspect, the third implementation of the seventh aspect, or the fourth implementation of the seventh aspect of the embodiments of the present invention, in a fifth manner of the seventh aspect of the embodiments of the present invention, receiving, by the eNB, the CSI and the SR that are sent by the UE on the first uplink channel resource in the uplink subframe includes receiving, by the eNB, the SR that is sent by the UE on a resource at a fixed location in the PUCCH resource in the uplink subframe using the first PUCCH format.

With reference to the fifth implementation of the seventh aspect of the embodiments of the present invention, in a sixth manner of the seventh aspect of the embodiments of the present invention, the resource at the fixed location in the PUCCH resource is one of a resource that is in the PUCCH resource and that is for a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal.

With reference to any one of the first implementation of the seventh aspect, the second implementation of the seventh aspect, the third implementation of the seventh aspect, the fourth implementation of the seventh aspect, the fifth implementation of the seventh aspect, or the sixth implementation of the seventh aspect of the embodiments of the present invention, in a seventh manner of the seventh aspect of the embodiments of the present invention, receiving, by the eNB, the CSI and the SR that are sent by the UE on the first uplink channel resource in the uplink subframe includes, when the eNB configures that the UE is not allowed to send a PUCCH and a PUSCH simultaneously, or the eNB configures that the UE is allowed to send a PUCCH and a PUSCH simultaneously and the UE determines that no PUSCH is sent in the uplink subframe, receiving, by the eNB, the CSI and the SR that are sent by the UE on the first uplink channel resource in the uplink subframe.

With reference to any one of the first implementation of the seventh aspect, the second implementation of the seventh aspect, the third implementation of the seventh aspect, the fourth implementation of the seventh aspect, the fifth implementation of the seventh aspect, or the sixth implementation of the seventh aspect of the embodiments of the present invention, in an eighth manner of the seventh aspect of the embodiments of the present invention, the method further includes configuring, by the eNB, a second uplink channel resource for the UE, where the second uplink channel resource is a resource that is used by the UE to send the SR. The method also includes, when the second uplink channel resource is a resource that has a second PUCCH format, receiving, by the eNB, the SR that is sent by the UE on the second uplink channel resource in the uplink subframe, where the second PUCCH format is a format that cannot be used to send the SR.

With reference to the seventh aspect of the embodiments of the present invention, in a ninth manner of the seventh aspect of the embodiments of the present invention, the CSI is aperiodic CSI, the first uplink channel resource is a PUSCH resource, and no uplink data information is to be sent on the PUSCH resource. Receiving, by the eNB, the CSI and the SR that are sent by the UE on the first uplink channel resource in the uplink subframe includes receiving, by the eNB, the CSI and the SR that are sent by the UE on the PUSCH resource in the uplink subframe.

With reference to the ninth implementation of the seventh aspect of the embodiments of the present invention, in a tenth manner of the seventh aspect of the embodiments of the present invention, the SR is sent on a resource at a first fixed location in the PUSCH resource.

With reference to the tenth implementation of the seventh aspect of the embodiments of the present invention, in an eleventh manner of the seventh aspect of the embodiments of the present invention, the resource at the first fixed location is any one of a resource that is in the PUSCH resource and that is used for sending a CRC bit of CRC check coding before a target moment, where the target moment is a moment at which the to-be-sent uplink control information is encoded, or a resource element at a preset location in the PUSCH resource, or a resource element that is preset in the PUSCH resource and that is used to carry a reference signal.

With reference to any one of the ninth implementation of the seventh aspect, the tenth implementation of the seventh aspect, or the eleventh implementation of the seventh aspect of the embodiments of the present invention, in a twelfth manner of the seventh aspect of the embodiments of the present invention, receiving, by the eNB, the SR that is sent by the UE on the PUSCH resource includes, when the eNB configures that the UE is not allowed to send a PUCCH and a PUSCH simultaneously, receiving, by the eNB, the SR that is sent by the UE on the PUSCH resource.

With reference to any one of the ninth implementation of the seventh aspect, the tenth implementation of the seventh aspect, the eleventh implementation of the seventh aspect, or the twelfth implementation of the seventh aspect of the embodiments of the present invention, in a thirteenth manner of the seventh aspect of the embodiments of the present invention, receiving, by the eNB, the SR that is sent by the UE on the PUSCH resource includes, when the UE determines that the uplink control information to be sent in the uplink subframe further includes a hybrid automatic repeat request acknowledgment (HARQ-ACK), receiving, by the eNB, the CSI, the SR, and the HARQ-ACK information that are sent by the UE on the PUSCH resource in the uplink subframe.

With reference to the thirteenth implementation of the seventh aspect of the embodiments of the present invention, in a fourteenth manner of the seventh aspect of the embodiments of the present invention, a resource at a second fixed location is set in the PUSCH resource to send status information of the HARQ-ACK.

With reference to the fourteenth implementation of the seventh aspect of the embodiments of the present invention, in a fifteenth manner of the seventh aspect of the embodiments of the present invention, the resource at the second fixed location is a resource element at a preset location in the PUCCH resource.

With reference to any one of the ninth implementation of the seventh aspect, the tenth implementation of the seventh aspect, the eleventh implementation of the seventh aspect, the twelfth implementation of the seventh aspect, the thirteenth manner of the seventh aspect, the fourteenth implementation of the seventh aspect, or the fifteenth implementation of the seventh aspect of the embodiments of the present invention, in a sixteenth manner of the seventh aspect of the embodiments of the present invention, the method further includes configuring, by the eNB, a second uplink channel resource for the UE, where the second uplink channel resource is a resource that is configured by the eNB for the UE and that is used to send the SR. The method further includes, when the eNB configures that the UE is not allowed to send the SR on the PUSCH resource, receiving, by the eNB, the SR information that is sent by the UE on the second uplink channel resource.

An eighth aspect of the embodiments of the present invention provides an uplink control information receiving method. The method includes determining, by an eNB, that uplink control information to be sent by a user equipment (UE) in an uplink subframe includes channel state information (CSI) and a hybrid automatic repeat request acknowledgment (HARQ-ACK), where the CSI is CSI of at least one of multiple carriers configured by the network device for the UE, and the HARQ-ACK is acknowledgment information (ACK) or negative acknowledgment information (NACK) corresponding to a downlink data channel. The method further includes determining, by the eNB, a first physical uplink control channel (PUCCH) resource that is used by the UE to send the CSI in the uplink subframe, where the first PUCCH resource is a PUCCH resource that has a first PUCCH format. The method also includes determining, by the eNB, that the HARQ-ACK is feedback information of a primary component carrier in the multiple carriers, or the HARQ-ACK is feedback information of carriers whose quantity is not greater than a preset quantity in the multiple carriers, and receiving, by the eNB, the CSI and the HARQ-ACK that are sent by the UE on the PUCCH resource in the uplink subframe using the first PUCCH format.

With reference to the eighth aspect of the embodiments of the present invention, in a first implementation of the eighth aspect of the embodiments of the present invention, a capacity of the first PUCCH format is greater than a preset bit quantity.

With reference to the first implementation of the eighth aspect of the embodiments of the present invention, in a second implementation of the eighth aspect of the embodiments of the present invention, the preset bit quantity is 11.

With reference to any one of the eighth aspect, the first implementation of the eighth aspect, or the second implementation of the eighth aspect of the embodiments of the present invention, in a third implementation of the eighth aspect of the embodiments of the present invention, the first PUCCH format is encoded using a convolutional code.

With reference to any one of the eighth aspect, the first implementation of the eighth aspect, the second implementation of the eighth aspect, or the third implementation of the eighth aspect of the embodiments of the present invention, in a fourth implementation of the eighth aspect of the embodiments of the present invention, a resource at a first fixed location in the PUCCH resource that has the first PUCCH format is used to send status information of the HARQ-ACK.

With reference to the fourth implementation of the eighth aspect of the embodiments of the present invention, in a fifth implementation of the eighth aspect of the embodiments of the present invention, the resource at the first fixed location in the PUCCH resource includes a resource element at a preset location in the PUCCH resource.

With reference to any one of the eighth aspect, the first implementation of the eighth aspect, the second implementation of the eighth aspect, the third implementation of the eighth aspect, the fourth implementation of the eighth aspect, or the fifth implementation of the eighth aspect of the embodiments of the present invention, in a sixth implementation of the eighth aspect of the embodiments of the present invention, the method further includes sending, by the eNB, configuration information to the UE, where the configuration information is used to indicate that the UE is allowed to send the CSI and the HARQ-ACK on the PUCCH resource that has the first PUCCH format.

With reference to any one of the eighth aspect, the first implementation of the eighth aspect, the second implementation of the eighth aspect, the third implementation of the eighth aspect, the fourth implementation of the eighth aspect, the fifth implementation of the eighth aspect, or the sixth implementation of the eighth aspect of the embodiments of the present invention, in a seventh implementation of the eighth aspect of the embodiments of the present invention, receiving, by the eNB, the CSI and the HARQ-ACK that are sent by the UE on the PUCCH resource in the uplink subframe using the first PUCCH format includes, when the eNB configures that the UE is not allowed to send a PUCCH and a PUSCH simultaneously, or when the eNB configures that the UE is allowed to send a PUCCH and a PUSCH simultaneously and the UE determines that no PUSCH is sent in the uplink subframe, receiving, by the eNB, the CSI and the HARQ-ACK that are sent by the UE on the PUCCH resource in the uplink subframe using the first PUCCH format.

With reference to the eighth aspect of the embodiments of the present invention, in an eighth implementation of the eighth aspect of the embodiments of the present invention, receiving, by the eNB, the CSI and the HARQ-ACK that are sent by the UE on the PUCCH resource in the uplink subframe using the first PUCCH format includes, when the UE determines that the uplink control information to be sent in the uplink subframe further includes an SR, receiving, by the eNB, the CSI, the HARQ-ACK, and the SR that are sent by the UE on the PUCCH resource.

With reference to the eighth implementation of the eighth aspect of the embodiments of the present invention, in a ninth implementation of the eighth aspect of the embodiments of the present invention, a resource at a second fixed location in the PUCCH resource is used to send the SR.

With reference to the ninth implementation of the eighth aspect of the embodiments of the present invention, in a tenth implementation of the eighth aspect of the embodiments of the present invention, the resource at the second fixed location in the PUCCH resource is one of a resource that is in the PUCCH resource and that is used for sending a CRC bit of CRC check coding before a target moment, where the target moment is a moment at which to-be-sent uplink control information is encoded, or a resource element at a preset location in the PUCCH resource, or a resource element that is preset in the PUCCH resource and that is used to carry a reference signal.

With reference to any one of the eighth implementation of the eighth aspect, the ninth implementation of the eighth aspect, or the tenth implementation of the eighth aspect of the embodiments of the present invention, in an eleventh implementation of the eighth aspect of the embodiments of the present invention, receiving, by the eNB, the CSI, the HARQ-ACK, and the SR that are sent by the UE on the PUCCH resource includes, when the eNB configures that the UE is not allowed to send a PUCCH and a PUSCH resource simultaneously, or the eNB configures that the UE is allowed to send a PUCCH and a PUSCH simultaneously and the UE determines that no PUSCH is sent in the uplink subframe, receiving, by the eNB, the CSI, the HARQ-ACK, and the SR that are sent by the UE on the PUCCH resource in the uplink subframe using the first PUCCH format.

In the embodiments of the present invention, the UE determines that the uplink control information to be sent in the uplink subframe includes the CSI and the SR, and the UE determines the first uplink channel resource used to send the CSI and the SR. The first uplink channel resource is a channel resource that has an SR sending format and that is used to send the CSI. The UE can then send the CSI and the SR on the first uplink channel resource in the uplink subframe. In this way, the UE sends the CSI and the SR on a same first uplink channel resource in a same uplink subframe, thereby ensuring that the eNB can obtain the scheduling request SR of the UE and allocate an uplink scheduling resource to the UE and can accurately obtain CSI of each carrier, and improving accuracy of resource scheduling by the eNB for the UE.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
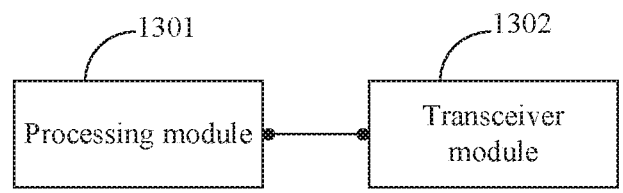
FIG. 1 is a schematic diagram of a user equipment (UE) according to an embodiment of the present invention.

In an LTE system, a resource block (RB) for transmitting a signal includes a time domain resource and a frequency domain resource. A minimum unit of the time domain resource is an orthogonal frequency division multiplexing (OFDM) symbol, and a minimum unit of the frequency domain resource is a subcarrier. In a current LTE system, one resource block includes 12 subcarriers in the frequency domain. In embodiments of the present invention, a time domain symbol may be, but is not limited to, an OFDM symbol in the LTE system. The time domain symbol may alternatively be a time domain symbol in another system, or a minimum unit in another form in the time domain.

LTE defines different PUCCH formats (as shown in Table 1).

TABLE 1

Introduction of PUCCH formats

| PUCCH format | Modulation scheme | Number of coded bits per subframe | Information |
|---|---|---|---|
| 1 | N/A | N/A | SR |
| 1a | binary phase shift keying (BPSK) | 1 | 1-bit ACK/NACK with/without SR |
| 1b | quadrature phase shift keying (QPSK) | 2 | 2-bit ACK/NACK with/without SR |
| 1b with channel selection | QPSK | 2 | Up to 4-bit ACK/NACK |
| 2 | QPSK | 20 | 20-bit CSI |
| 2 | QPSK | 20 | 20-bit CSI + 1-bit or 2-bit ACK/NACK (only for extended (cyclic prefix)CP) |
| 2a | QPSK + BPSK | 21 | 20-bit CSI + 1-bit ACK/NACK (only support normal CP) |
| 2b | QPSK + QPSK | 22 | 20-bit CSI + 2-bit ACK/NACK (only support normal CP) |
| 3 | QPSK | 48 | For FDD, up to 10-bit ACK/NACK For TDD, up to 20-bit ACK/NACK |
| 3 | QPSK | 48 | For FDD, up to 10-bit ACK/NACK + 1-bit SR For TDD, up to 20-bit ACK/NACK + 1-bit SR |

The PUCCH format, i.e., format 1, carries SR information. A UE may need to send an SR only when requesting an uplink resource. In another case, the UE may not send the SR for saving power and reducing interference. From this point of view, the SR information is different from HARQ-ACK information. This is because, for a HARQ-ACK, what is to be determined is whether an ACK or a NACK is sent; while, for the SR, what is to be determined is whether or not the SR is sent. A base station may need to perform status detection during HARQ-ACK detection, determining, generally, whether a status is an ACK state or a NACK state; however, SR detection may be performed to determine whether an SR is present by determining whether there is energy on a PUCCH resource for the SR.

In the PUCCH format 1a, for transmission of 1-bit hybrid automatic repeat request acknowledgment (HARQ-ACK) information, binary phase shift keying (BPSK) modulation may be used, and the HARQ-ACK information may correspond to a single-cell and single-codeword scenario. If an SR needs to be sent at the same time, SR information may be further carried.

In the PUCCH format 1b, for transmission of 2-bit HARQ-ACK information, quadrature phase shift keying (QPSK) modulation may be used, and the HARQ-ACK information may correspond to a single-cell and dual-codeword scenario. If an SR needs to be sent at the same time, SR information may be further carried.

In the PUCCH format 2, for a normal cyclic prefix (Normal CP), only 20-bit CSI information may be carried; for an extended CP, not only the 20-bit CSI information is carried, but also 1-bit or 2-bit acknowledgment (ACK)/negative acknowledgment (NACK) information may be carried. Both the normal CP and the extended CP may use QPSK modulation. A channel structure of the PUCCH format 2 is described as follows. In a case of the normal CP, the second and the sixth symbols in each slot of an RB for transmitting the PUCCH format 2 are used to transmit a demodulation reference signal (DM-RS), and the remaining five symbols are used to transmit a PUCCH. In a case of the extended CP, each slot has only six symbols. In this case, only one symbol (the fourth symbol) is used to transmit a DM-RS, and the remaining five symbols are used to transmit a PUCCH. A channel quality information (CQI) resource configured for UE may be configured using a "cqi-PUCCH-ResourceIndex" of a CQI-PUCCH-resource index information element in a CQI period configuration "CQI-ReportPeriodic" message.

In the PUCCH format 2a, 20-bit CSI information (QPSK modulation) and 1-bit ACK/NACK information (corresponding to a single-cell and single-codeword scenario, and using BPSK modulation) may be carried.

In the PUCCH format 2b, 20-bit CSI information (QPSK modulation) and 2-bit ACK/NACK information (corresponding to a single-cell and dual-codeword scenario, and using QPSK modulation) may be carried.

In the PUCCH format 2a/2b, only the normal CP is supported.

In the PUCCH format 3, a maximum of five serving cells can be supported, and transmission of HARQ-ACK in a MIMO scenario may be configured in each serving cell for a UE. When an SR needs to be transmitted at the same time, simultaneous HARQ-ACK and SR transmission can be supported. In addition, CSI information of a maximum of one carrier may be transmitted when a capacity permits. In a channel structure of the PUCCH format 3, specifically, Reed Muller (RM) channel coding may be performed on original bits, such as 20 bits, to generate 48 bits, coded bits may be scrambled, and scrambled bits may be modulated into 24 quadrature phase shift keying (QPSK) symbols and are separately put into two slots of one subframe. In this way, each slot has 12 QPSK symbols, and the 12 QPSK symbols may be put on 12 consecutive subcarriers on one time domain symbol of one slot, that is, occupying 12 subcarriers on one time domain symbol in one resource block (RB). Then orthogonal cover code (OCC) spread spectrum with a length of 5 may be performed for each slot in the time domain using a sequence w. One slot may occupy five time domain symbols in one RB, different UEs may perform code division multiplexing on one RB using different OCCs, and the other two symbols may be used to carry a reference signal (RS). Then DFT precoding and inverse fast Fourier transform (IFFT) may be performed on data obtained after the spread spectrum is performed.

With further evolution of the LTE technology, an HARQ-ACK feedback occupying more bits, such as more than 20 bits, may need to be supported in the future. For example, capacity allocation (CA) of more carriers, such as CA of 10 carriers, is introduced. In one example, CA may be performed using 10 carriers of a time division duplex (TDD) uplink/downlink configuration 2, and a 40-bit HARQ-ACK needs to be fed back. In another example, although a maximum of five carriers are supported for CA, multiple carriers of the five carriers may be configured using a TDD uplink/downlink configuration 5. For example, a primary component carrier may be configured using the uplink/downlink configuration 2, and four secondary component carriers may all be configured using the uplink/downlink configuration 5. Then a (4+9*4=40)-bit HARQ-ACK needs to be fed back. To support transmission of an HARQ-ACK with more than 20 bits, a possible manner is introducing a PUCCH format that can support transmission of more bits, such as a new PUCCH format. The new PUCCH format may be any one of a new PUCCH format 1 (e.g., the new PUCCH format 1 may be a PUCCH format 3-based format 1 (i.e., PUCCH format 3-based format 1)), a new PUCCH format 2 (e.g., the new PUCCH format 2 may be a PUCCH format 3-based format 2 (i.e., PUCCH format 3-based format 2)), a new PUCCH format 3 (e.g., the new PUCCH format 3 may be a PUCCH format 3-based format 3 (i.e., PUCCH format 3-based format 3)), a new PUCCH format 4 (e.g., the new PUCCH format 4 may be a PUCCH format 3-based format 4 (i.e., PUCCH format 3-based format 4)), a new PUCCH format 5 (e.g., the new PUCCH format 5 may be a PUCCH format 3-based format 5 (i.e., PUCCH format 3-based format 5)), or a new PUCCH format 6 (e.g., the new PUCCH format 6 may be a PUSCH format-based format 1 (i.e., PUSCH format-based format 1)). In addition, different types of uplink control information (UCI) information may use the same or different channel coding schemes or coding rates. Forms of the new PUCCH formats are specifically described as follows.

1. New PUCCH Format 1

Figure 19:
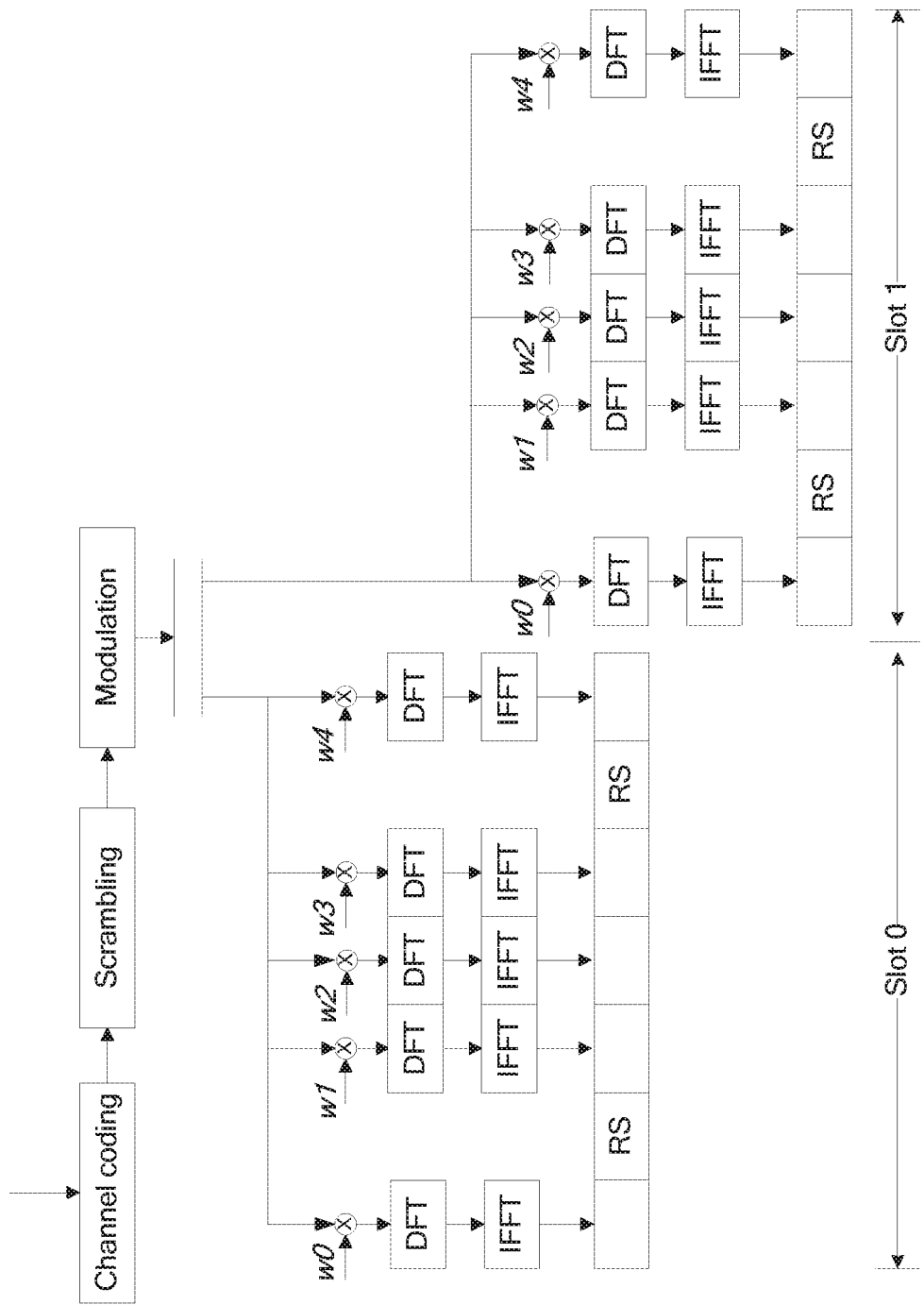
FIG. 19 is a schematic diagram of a new PUCCH format 1 according to an embodiment of the present invention.

Referring to FIG. 19, DFT represents discrete Fourier transform, IFFT represents inverse Fourier transform, w0 to w4 are the first bit to the fifth bit of an orthogonal cover code, and an RS is a reference signal. The channel structure of the PUCCH format 3 is used. For example, resource mapping of an information coding and modulation symbol and mapping of a demodulation reference signal are performed in the same way as those of the PUCCH format 3. A difference is that original bit information in the new PUCCH format 1 is uplink control information that does not include an HARQ-ACK. For example, the new PUCCH format 1 may be used to transmit only CSI, or the new PUCCH format 1 may be used to transmit CSI and an SR. In addition to RM coding, the original bit information in the format may be encoded using a convolutional code, for example, a tail biting convolutional code (Tail Biting CC, or TBCC). Modulated symbols may be separately put into two slots of one subframe. In this way, each slot has 12 modulated symbols, and the 12 modulated symbols are put on 12 consecutive subcarriers on one time domain symbol of one slot, that is, occupying 12 subcarriers on one time domain symbol in one resource block (RB). Orthogonal cover code (OCC) spread spectrum with a length of 5 may be performed for each slot in the time domain using a sequence w. One slot may occupy five time domain symbols in one RB, different UEs may perform code division multiplexing on one RB using different OCCs, and the other two time domain symbols may be used to carry a reference signal (RS). Then DFT and IFFT are performed on data obtained after the spread spectrum is performed.

2. New PUCCH Format 2

Figure 20:
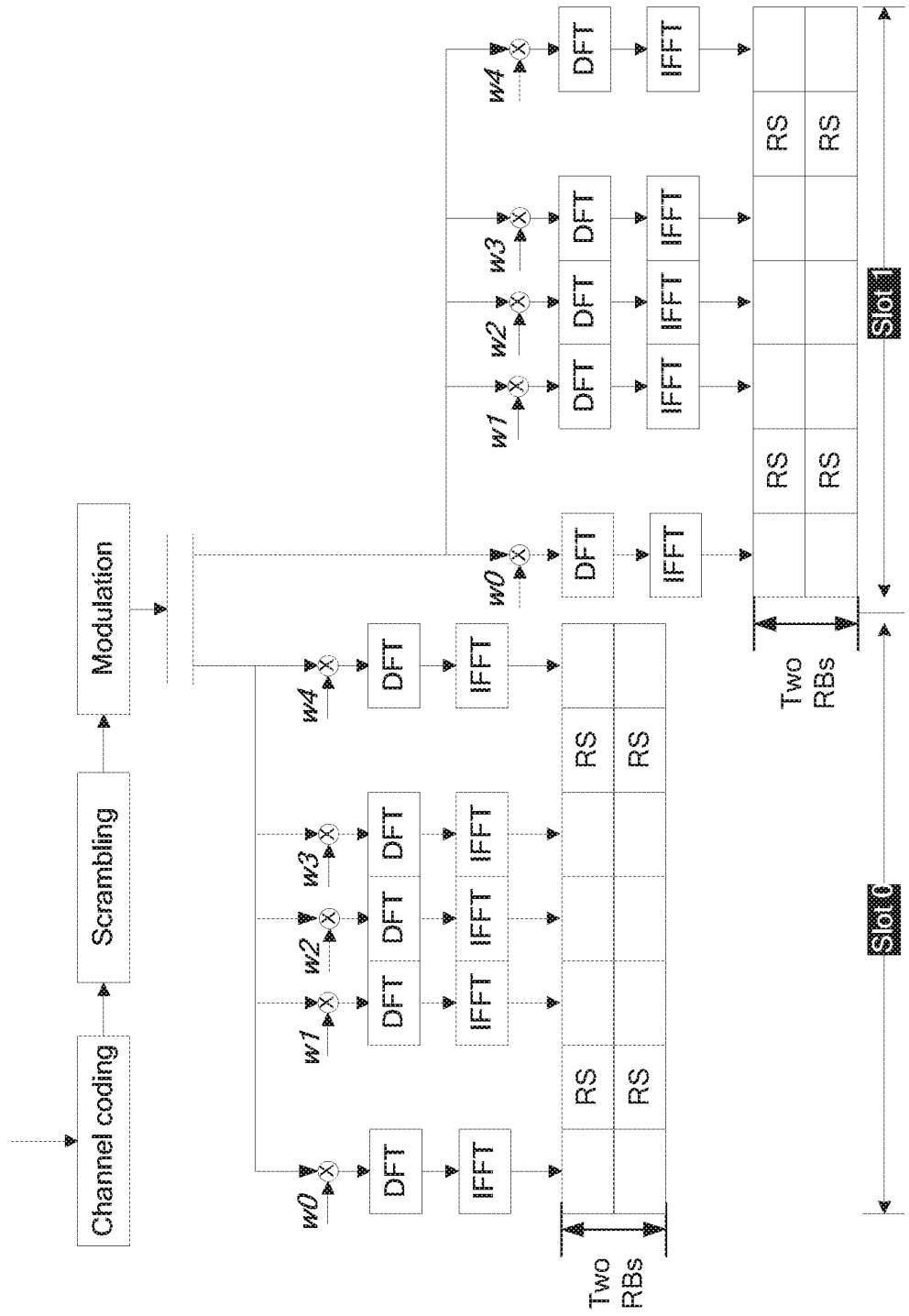
FIG. 20 is a schematic diagram of a new PUCCH format 2 according to an embodiment of the present invention.

Referring to FIG. 20, a channel resource of the new format 2 may occupy N (N>1) RBs, and DFT with a length of N×12 may be performed on spread spectrum data in the N RBs on each time domain symbol. For example, there are two RBs, and each slot occupies 24 subcarriers. Modulated symbols may be separately put on subcarriers of the two RBs in one subframe. OCC spread spectrum with a length of 5 may be performed for each slot in the time domain using a sequence w. One slot may occupy five time domain symbols, and the other two time domain symbols may be used to carry a RS. A mapping location of a demodulation reference signal may be the same as that of the PUCCH format 3. Then DFT with a length of 24 may be performed on data, obtained after spread spectrum, in the two RBs on each time domain symbol. The new PUCCH format 2 may also be applied to cases of three RBs or more RBs, and spreading may need to be performed only in the frequency domain. In addition to RM coding, original bit information in the format may be encoded using a convolutional code, for example, a TBCC.

3. New PUCCH Format 3

Figure 21:
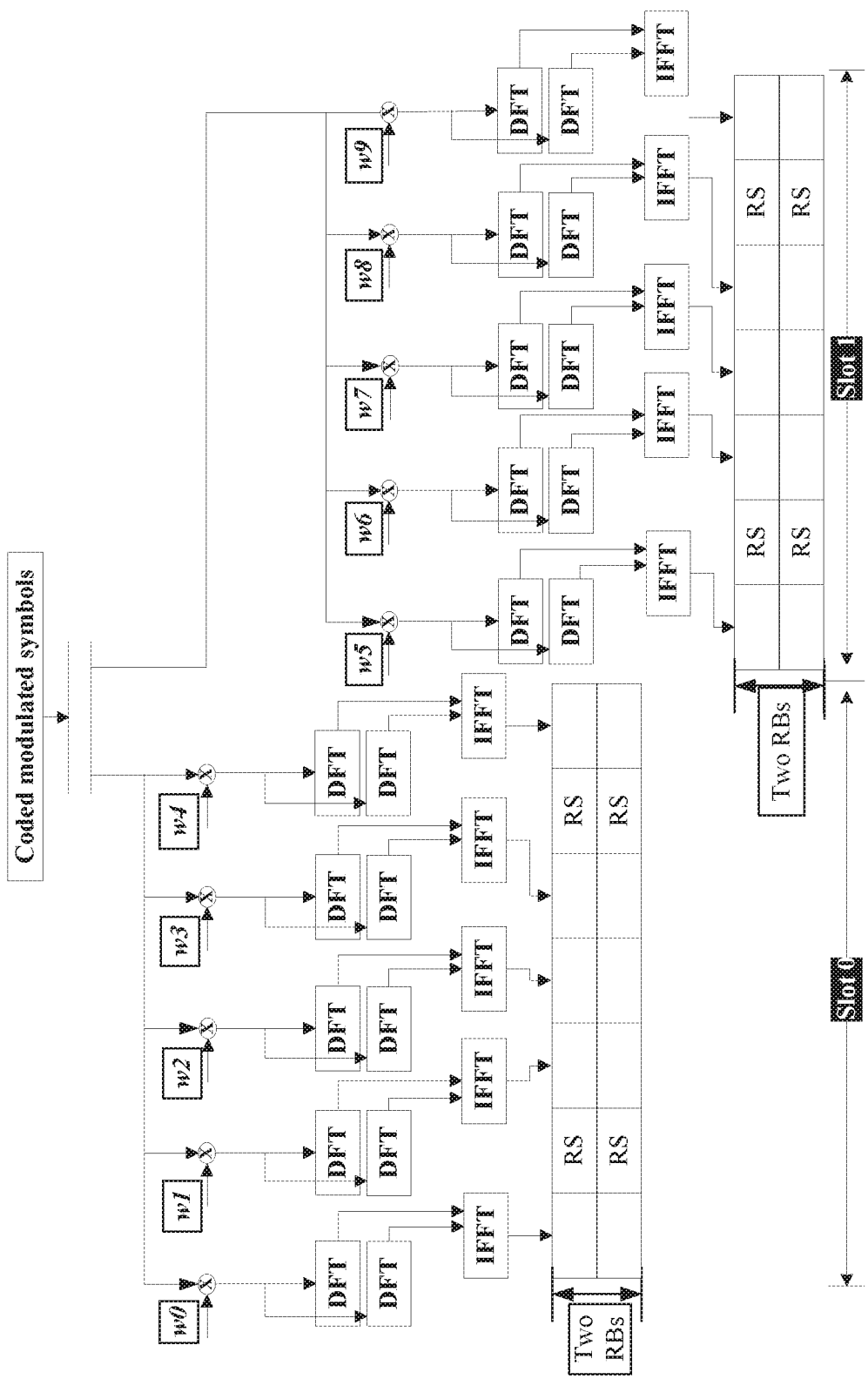
FIG. 21 is a schematic diagram of a new PUCCH format 3 according to an embodiment of the present invention.

Referring to FIG. 21, a channel resource may occupy N (N>1) RBs, and DFT with a length of 12 may be separately performed on spread spectrum data in each RB on each time domain symbol. For example, there are two RBs, and 12 subcarriers occupied by each slot are spread to 24 subcarriers occupied by each slot. Channel coding may be performed on original bits, coded bits may be scrambled, scrambled bits may be modulated, and modulated symbols may then be separately put on subcarriers of the two RBs in one subframe. Then OCC spread spectrum with a length of 5 may be performed for each slot in the time domain using a sequence w. One slot may occupy five time domain symbols, and the other two time domain symbols may be used to carry an RS. A mapping location of a demodulation reference signal may be the same as that of the PUCCH format 3. Then DFT with a length of 12 may be separately performed on data obtained after the spread spectrum in each of the two RBs on each time domain symbol. The new PUCCH format 3 may also be applicable to cases of three RBs or more RBs, and spreading may need to be performed only in the frequency domain. In addition to RM coding, original bit information in the format may be encoded using a convolutional code, for example, a TBCC.

4. New PUCCH Format 4

A channel resource may occupy N (N≥1) RBs. Modulated symbols may be separately put on at least two time domain symbols of one slot, and each of the at least two time domain symbols may use an OCC spread spectrum code with a length of M (M<5) in the time domain. In one embodiment, discrete Fourier transform-spread-orthogonal frequency division multiplexing (DFT-Spread-OFDM, or DFT-S-OFDM) may be used for transmission in the channel resource, and DFT with a length of N×12 on spread spectrum data in the N RBs may be performed on each time domain symbol. Modulated symbols may be separately put on K time domain symbols of one slot. K is an integer greater than or equal to 2. OCC spread spectrum with a length of M (M<5) may be performed on each of the K time domain symbols in the time domain. Modulated symbols obtained after the spread spectrum may occupy M time domain symbols, and two time domain symbols in each slot may be used to carry a RS. A mapping location of a demodulation reference signal may be the same as that of the PUCCH format 3. Alternatively, one time domain symbol in each slot may be used to carry a reference signal. In a case of a normal CP, one time domain symbol in the middle of each slot may carry a demodulation reference signal; and in a case of an extended CP, the third time domain symbol in each slot may carry a demodulation reference signal. DFT may be performed on data obtained after the spread spectrum. In another embodiment, DFT-S-OFDM may be used for transmission in each RB resource of the N RBs, and DFT with a length of 12 may be separately performed on spread spectrum data in each RB on each time domain symbol. Channel coding may be performed on original bits, and coded bits may be modulated and separately put on K time domain symbols in one subframe. OCC spread spectrum with a length of M (M<5) may be performed on each of the K time domain symbols in the time domain. Each modulated symbol to be sent may occupy M time domain symbols, and two time domain symbols in each slot may be used to carry an RS. A mapping location of a demodulation reference signal may be the same as that of the PUCCH format 3. In addition to RM coding, original bit information in the format may be encoded using a convolutional code, for example, a TBCC.

5. New PUCCH Format 5

A channel resource may occupy N (N≥1) RBs. Two modulated symbols may be put on one time domain symbol, and the two modulated symbols may respectively use two different OCC spread spectrum codes with a length of 5. In one embodiment, DFT-Spread-OFDM may be used for transmission in the channel resource, and DFT with a length of N×12 may be performed on spread spectrum data in the N RBs on each time domain symbol. Two time domain symbols in each slot may be used to carry a RS. A mapping location of a demodulation reference signal may be the same as that of the PUCCH format 3. Alternatively, one time domain symbol in each slot may be used to carry a reference signal. In a case of a normal CP, one time domain symbol in the middle of each slot may carry a demodulation reference signal; and in a case of an extended CP, the third time domain symbol in each slot may carry a demodulation reference signal. DFT may be performed on data obtained after spread spectrum. In another embodiment, DFT-S-OFDM may be used for transmission in each RB resource of the N RBs, and DFT with a length of 12 may be performed separately on spread spectrum data in each RB on each time domain symbol. Two time domain symbols in each slot may be used to carry an RS. A mapping location of a demodulation reference signal may be the same as that of the PUCCH format 3. In addition to RM coding, original bit information in the format may be encoded using a convolutional code, for example, a TBCC.

6. New PUCCH Format 6

Figure 22:
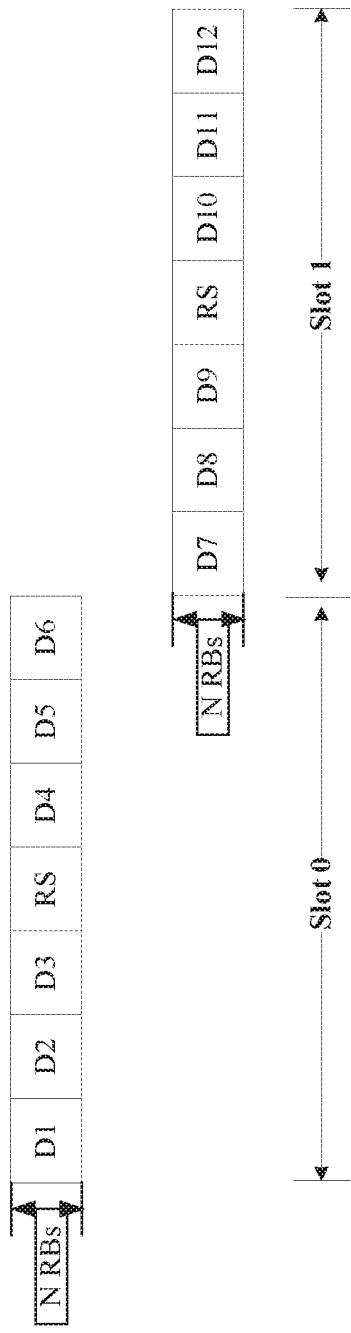
FIG. 22 is a schematic diagram of a new PUCCH format 6 according to an embodiment of the present invention.

Referring to FIG. 22, D1 to D12 are control information, and an RS is a reference signal. A channel resource may occupy N(N≥1) RBs. In a case of a normal CP, one time domain symbol in the middle of each slot may carry a demodulation reference signal; and in a case of an extended CP, the third time domain symbol in each slot may carry a demodulation reference signal. Modulated symbols may be mapped to another location in the slot other than a location of the demodulation reference signal, and then DFT may be performed. Original bit information in the format may be encoded using a convolutional code, for example, a TBCC.

The embodiments of the present invention disclose an uplink control information sending method and receiving method, and a related apparatus. Referring to FIG. 1, an embodiment of a user equipment (UE) includes a processing module 1301 and a transceiver module 1302.

The processing module 1301 may be configured to determine that uplink control information to be sent in an uplink subframe includes channel state information (CSI) and an SR. The CSI is CSI of at least one of multiple carriers configured by a base station (e.g., an eNB) for the UE. Detailed description will be provided in the following in description of steps S101 and S102.

The processing module 1301 may further be configured to determine a first uplink channel resource for the CSI, where the first uplink channel resource is a resource that is configured by the eNB for the UE and that is used to send the CSI. Detailed description will be provided in the following in description of step S103.

The transceiver module 1302 may be configured to send the CSI and the SR on the first uplink channel resource in the uplink subframe. Detailed description will be provided in the following in the description of step S104.

Optionally, the CSI may be periodic CSI, the first uplink channel resource may be a physical uplink control channel (PUCCH) resource, and the PUCCH resource may be a resource that has a first PUCCH format. Detailed description will be provided in the following in description of step S201.

Optionally, the transceiver module 1302 may specifically be configured to send the CSI and the SR on the PUCCH resource in the uplink subframe using the first PUCCH format.

Optionally, the first PUCCH format specifies an amount of control information allowed in a PUCCH of a subframe, and the amount may be greater than a preset bit quantity.

Optionally, the preset bit quantity is 11.

Optionally, the first PUCCH format may be encoded using a convolutional code.

Optionally, the transceiver module 1302 may specifically be further configured to send the SR on a resource at a fixed location in the PUCCH resource in the uplink subframe using the first PUCCH format.

Optionally, the resource at the fixed location in the PUCCH resource may be one of the following resources, i.e., a resource that is in the PUCCH resource and that is for a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal. Detailed description will be provided in the following in description of step of S203.

Optionally, the transceiver module 1302 may specifically be further configured to, when the processing module 1301 determines that the eNB configures that a PUCCH and a PUSCH are not allowed to be sent simultaneously, or when the processing module 1301 determines that the eNB configures that a PUCCH and a PUSCH are allowed to be sent simultaneously and that no PUSCH is sent in the uplink subframe, send the CSI and the SR on the PUCCH resource in the uplink subframe using the first PUCCH format.

Optionally, the processing module 1301 may further be configured to determine a second uplink channel resource, where the second uplink channel resource is a resource that is configured by the eNB for the UE and that is used to send the SR, and when the processing module 1301 determines that the first uplink channel resource is a PUCCH resource that has a second PUCCH format, the transceiver module 1302 may further be configured to send the SR on the second uplink channel resource in the uplink subframe, where the second PUCCH format is a format that cannot be used to send the SR. Detailed description will be provided in the following in description of step S204.

Optionally, the processing module 1301 may further be configured to determine a quantity of bits occupied by the CSI to be sent in the uplink subframe, a quantity of bits occupied by the SR to be sent in the uplink subframe, and a capacity $N_a$ of the PUCCH resource. The processing module 1301 may further may also be configured to determine that a sum $N_1$ of the quantity of bits occupied by the CSI and the quantity of bits occupied by the SR is greater than the capacity $N_a$ of the PUCCH resource, and discard $N_2$ bits of CSI that has a low priority, where $N_2$ satisfies $N_1 - N_2 \leq N_a$. Detailed description will be provided in the following in description of step S205.

Optionally, the CSI may be aperiodic CSI, the first uplink channel resource may be a physical uplink shared channel (PUSCH) resource, and no uplink data information is to be sent on the PUSCH resource. Detailed description will be provided in the following in description of step S301.

Optionally, the transceiver module 1302 may specifically be further configured to send the CSI and the SR on the PUSCH resource in the uplink subframe.

Optionally, the SR may be sent on a resource at a first fixed location in the PUSCH resource.

Optionally, the resource at the first fixed location may be any one of the following resources, i.e., a resource that is in the PUSCH resource and that is used for sending a CRC bit of CRC check coding before a target moment, where the target moment is a moment at which the to-be-sent uplink control information is encoded, or a resource element at a preset location in the PUSCH resource, or a resource element that is preset in the PUSCH resource and that is used to carry a reference signal. Detailed description will be provided in the following in description of step S303.

Optionally, the transceiver module 1302 may specifically be further configured to, when the processing module 1301 determines that the eNB configures that a PUCCH and a PUSCH are not allowed to be sent simultaneously, send the SR on the PUSCH resource.

Optionally, the transceiver module 1301 may specifically be further configured to, when the processing module 1301 determines that the uplink control information to be sent in the uplink subframe further includes a hybrid automatic repeat request acknowledgment (HARQ-ACK), send the CSI, the SR, and the HARQ-ACK information on the PUSCH resource in the uplink subframe.

Optionally, a resource at a second fixed location may be set in the PUSCH resource to send status information of the HARQ-ACK.

Optionally, the resource at the second fixed location may be a resource element at a preset location in the PUCCH resource.

Optionally, the transceiver module 1302 may further be configured to, when the processing module 1301 determines that it is configured that the SR is not allowed to be sent on the PUSCH resource, send the SR information on a second uplink channel resource, where the second uplink channel resource is a resource that is configured by the eNB for the UE and that is used to send the SR. Detailed description will be provided in the following in description of step S304.

Figure 2:
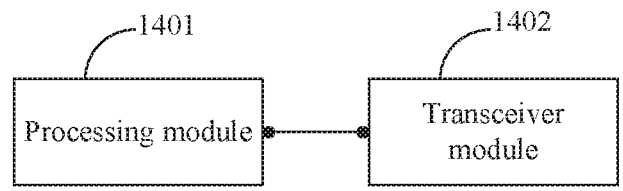
FIG. 2 is a schematic diagram of another UE according to an embodiment of the present invention.

Referring to FIG. 2, another embodiment of a UE includes a processing module 1401 and a transceiver module 1402.

The processing module 1401 may be configured to determine that uplink control information to be sent in an uplink subframe includes channel state information (CSI) and a hybrid automatic repeat request acknowledgment (HARQ-ACK), where the CSI is CSI of at least one of multiple carriers configured by a base station (e.g., an eNB) for the UE, and the HARQ-ACK is acknowledgment information (ACK) or negative acknowledgment information (NACK) corresponding to a downlink data channel. Detailed description will be provided in the following in description of step S401.

The processing module 1401 may further be configured to determine a first physical uplink control channel (PUCCH) resource for the CSI, where the first PUCCH resource is a PUCCH resource that has a first PUCCH format. Detailed description will be provided in the following in description of step S402.

The processing module 1401 may further be configured to determine that the HARQ-ACK is feedback information of a primary component carrier in the multiple carriers, or the HARQ-ACK is feedback information of carriers whose quantity is not greater than a preset quantity in the multiple carriers.

The transceiver module 1402 may be configured to send the CSI and the HARQ-ACK on the first PUCCH resource in the uplink subframe using the first PUCCH format. Detailed description will be provided in the following in description of step S403.

Optionally, a capacity of the first PUCCH format may be greater than a preset bit quantity.

Optionally, the preset bit quantity is 11.

Optionally, the first PUCCH format may be encoded using a convolutional code.

Optionally, a resource at a first fixed location in the PUCCH resource may be used to send the HARQ-ACK.

Optionally, the resource at the first fixed location in the PUCCH resource may include a resource element at a preset location in the PUCCH resource.

Detailed description will be provided in the following in description of step S502.

Optionally, the processing module 1401 may be further configured to obtain configuration information, where the configuration information is used to indicate that the UE is allowed to send the CSI and the HARQ-ACK on the first PUCCH resource that has the first PUCCH format. Detailed description will be provided in the following in description of step S503.

Optionally, the transceiver module 1402 may be specifically further configured to, when the processing module 1401 determines that the eNB configures that a PUCCH and a PUSCH are not allowed to be sent simultaneously, or when the processing module 1401 determines that the eNB configures that a PUCCH and a PUSCH are allowed to be sent simultaneously and that no PUSCH is sent in the uplink subframe, send the CSI and the HARQ-ACK on the PUCCH resource in the uplink subframe using the first PUCCH format. Detailed description will be provided in the following in description of step S504.

Optionally, the processing module 1401 may further be configured to determine a quantity of bits occupied by the CSI to be sent in the uplink subframe, a quantity of bits occupied by the HARQ-ACK to be sent in the uplink subframe, and a capacity $M_a$ of the PUCCH resource. The processing module 1401 may be configured to determine that a sum M of the quantity of bits occupied by the CSI and the quantity of bits occupied by the HARQ-ACK is greater than the capacity $M_a$ of the PUCCH, and discard 2 bits of CSI that has a low priority, where $M_2$ satisfies $M_1-M_2 \leq M_a$. Detailed description will be provided in the following in description of step S505.

Optionally, the transceiver module 1402 may be specifically further configured to, when the processing module 1401 determines that the uplink control information to be sent in the uplink subframe further includes an SR, send the CSI, the HARQ-ACK, and the SR on the PUCCH resource.

Optionally, a resource at a second fixed location in the PUCCH resource may be used to send the SR.

Optionally, the resource at the second fixed location in the PUCCH resource may be one of the following resources, i.e., a resource that is in the PUCCH resource and that is used for sending a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal. Detailed description will be provided in the following in description of step S603.

Optionally, the transceiver module 1402 may be specifically further configured to, when the processing module 1401 determines that the eNB configures that a PUCCH and a PUSCH resource are not allowed to be sent simultaneously, or when the processing module 1401 determines that the eNB configures that a PUCCH and a PUSCH are allowed to be sent simultaneously and that no PUSCH is sent in the uplink subframe, send the CSI, the HARQ-ACK, and the SR on the PUCCH resource in the uplink subframe using the first PUCCH format. Detailed description will be provided in the following in description of step S605.

Optionally, the processing module 1401 may be specifically further configured to determine a quantity of bits occupied by the CSI to be sent in the uplink subframe, a quantity of bits occupied by the HARQ-ACK to be sent in the uplink subframe, a quantity of bits occupied by the SR to be sent in the uplink subframe, and a capacity a of the PUCCH resource. The processing module 1401 may be configured to determine that a sum $Y_a$ of the quantity of bits occupied by the CSI, the quantity of bits occupied by the HARQ-ACK, and the quantity of bits occupied by the SR is greater than the capacity $Y_a$ of the PUCCH resource, and discard $Y_2$ bits of CSI that has a low priority, where $Y_2$ satisfies $Y_1-Y_2 \leq Y_a$. Detailed description will be provided in the following in description of step S606.

Figure 3:
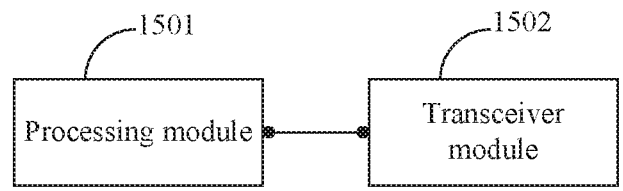
FIG. 3 is a schematic diagram of an eNB according to an embodiment of the present invention.

Referring to FIG. 3, an embodiment of a base station (e.g., an eNB) includes a processing module 1501 and a transceiver module 1502.

The processing module 1501 may be configured to determine that uplink control information to be sent by a UE in an uplink subframe includes channel state information (CSI) and an SR, where the CSI is CSI of at least one of multiple carriers configured by the eNB for the UE. Detailed description will be provided in the following in description of steps S701 and S702.

The processing module 1501 may further be configured to determine a first uplink channel resource that is used by the UE to send the CSI in the uplink subframe. Detailed description will be provided in the following in description of step S703.

The transceiver module 1502 may be configured to receive the CSI and the SR that are sent by the UE on the first uplink channel resource in the uplink subframe. Detailed description will be provided in the following in description of step S704.

Optionally, the CSI may be periodic CSI, the first uplink channel resource may be a physical uplink control channel (PUCCH) resource, and the PUCCH resource may be a resource that has a first PUCCH format. Detailed description will be provided in the following in description of step S801.

The transceiver module 1502 may be specifically configured to receive the CSI and the SR that are sent by the UE on the PUCCH resource in the uplink subframe using the first PUCCH format.

Optionally, a capacity of the first PUCCH format may be greater than a preset bit quantity.

Optionally, the preset bit quantity is 11.

Optionally, the first PUCCH format may be encoded using a convolutional code.

Optionally, the transceiver module 1502 may be specifically further configured to receive the SR that is sent by the UE on a resource at a fixed location in the PUCCH resource in the uplink subframe using the first PUCCH format.

Optionally, the resource at the fixed location in the PUCCH resource may be one of the following resources, i.e., a resource that is in the PUCCH resource and that is for a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal. Detailed description will be provided in the following in description of step S803.

Optionally, the transceiver module 1502 may be specifically further configured to, when the processing module 1501 configures that the UE is not allowed to send a PUCCH and a PUSCH simultaneously, or the processing module 1501 configures that the UE is allowed to send a PUCCH and a PUSCH simultaneously and the UE determines that no PUSCH is sent in the uplink subframe, receive the CSI and the SR that are sent by the UE on the first uplink channel resource in the uplink subframe.

Optionally, the processing module 1502 may be specifically further configured to configure a second uplink channel resource for the UE, where the second uplink channel resource is a resource that is used by the UE to send the SR. When the second uplink channel resource is a resource that has a second PUCCH format, the transceiver module is further configured to receive the SR that is sent by the UE on the second uplink channel resource in the uplink subframe, where the second PUCCH format is a format that cannot be used to send the SR. Detailed description will be provided in the following in description of step S804.

Optionally, the CSI may be aperiodic CSI, the first uplink channel resource may be a physical uplink shared channel (PUSCH) resource, and no uplink data information is to be sent on the PUSCH resource.

The transceiver module 1502 may be specifically further configured to receive the CSI and the SR that are sent by the UE on the PUSCH resource in the uplink subframe.

Optionally, the SR may be sent on a resource at a first fixed location in the PUSCH resource.

Optionally, the resource at the first fixed location may be any one of the following resources, i.e., a resource that is in the PUSCH resource and that is used for sending a CRC bit of CRC check coding before a target moment, where the target moment is a moment at which the to-be-sent uplink control information is encoded, or a resource element at a preset location in the PUSCH resource, or a resource element that is preset in the PUSCH resource and that is used to carry a reference signal. Detailed description will be provided in the following in description of step S9003.

Optionally, the transceiver module 1502 may be specifically further configured to, when the processing module configures that the UE is not allowed to send a PUCCH and a PUSCH simultaneously, receive the SR that is sent by the UE on the PUSCH resource. Detailed description will be provided in the following in description of step S904.

Optionally, the transceiver module 1502 may be specifically further configured to, when the UE determines that the uplink control information to be sent in the uplink subframe further includes a hybrid automatic repeat request acknowledgment (HARQ-ACK), receive the CSI, the SR, and the HARQ-ACK information that are sent by the UE on the PUSCH resource in the uplink subframe. Detailed description will be provided in the following in description of step S903.

Optionally, a resource at a second fixed location may be set in the PUSCH resource to send status information of the HARQ-ACK.

Optionally, the resource at the second fixed location may be a resource element at a preset location in the PUCCH resource.

Optionally, the processing module 1501 may be specifically further configured to configure a second uplink channel resource for the UE, where the second uplink channel resource is a resource that is configured by the eNB for the UE and that is used to send the SR, and when the processing module 1501 configures that the UE is not allowed to send the SR on the PUSCH resource, receive the SR information that is sent by the UE on the second uplink channel resource. Detailed description will be provided in the following in description of step S903.

Figure 4:
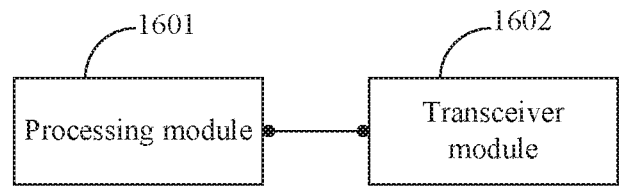
FIG. 4 is a schematic diagram of another eNB according to an embodiment of the present invention.

Referring to FIG. 4, another embodiment of a base station (e.g., an eNB) includes a processing module 1601 and a transceiver module 1602.

The processing module 1601 may be configured to determine that uplink control information to be sent by a UE in an uplink subframe includes channel state information (CSI) and a hybrid automatic repeat request acknowledgment (HARQ-ACK), where the CSI is CSI of at least one of multiple carriers configured by a network device for the UE, and the HARQ-ACK is acknowledgment information (ACK) or negative acknowledgment information (NACK) corresponding to a downlink data channel. Detailed description will be provided in the following in description of step S1001.

The processing module 1601 may be further configured to determine a first physical uplink control channel (PUCCH) resource that is used by the UE to send the CSI in the uplink subframe, where the first PUCCH resource is a PUCCH resource that has a first PUCCH format. Detailed description will be provided in the following in description of step S1002.

The processing module 1601 may further be configured to determine that the HARQ-ACK is feedback information of a primary component carrier in the multiple carriers, or the HARQ-ACK is feedback information of carriers whose quantity is not greater than a preset quantity in the multiple carriers.

The transceiver module 1602 may be configured to receive the CSI and the HARQ-ACK that are sent by the UE on the PUCCH resource in the uplink subframe using the first PUCCH format. Detailed description will be provided in the following in description of step S1003.

Optionally, a capacity of the first PUCCH format may be greater than a preset bit quantity.

Optionally, the preset bit quantity is 11.

Optionally, the first PUCCH format may be encoded using a convolutional code.

Optionally, a resource at a first fixed location in the PUCCH resource that has the first PUCCH format may be used to send status information of the HARQ-ACK.

Optionally, the resource at the first fixed location in the PUCCH resource may include a resource element at a preset location in the PUCCH resource.

Detailed description will be provided in the following in description of step S1102.

Optionally, the transceiver module 1602 may be specifically further configured to send configuration information to the UE, where the configuration information is used to indicate that the UE is allowed to send the CSI and the HARQ-ACK on the physical uplink control channel (PUCCH) resource that has the first PUCCH format.

Detailed description will be provided in the following in description of step S1103.

Optionally, the transceiver module 1602 may be specifically further configured to, when the processing module 1601 configures that the UE is not allowed to send a PUCCH and a PUSCH simultaneously, or when the processing module 1601 configures that the UE is allowed to send a PUCCH and a PUSCH simultaneously and the UE determines that no PUSCH is sent in the uplink subframe, receive the CSI and the HARQ-ACK that are sent by the UE on the PUCCH resource in the uplink subframe using the first PUCCH format.

Detailed description will be provided in the following in description of step S1104.

Optionally, the transceiver module 1602 may be specifically further configured to, when the UE determines that the uplink control information to be sent in the uplink subframe further includes an SR, receive the CSI, the HARQ-ACK, and the SR that are sent by the UE on the PUCCH resource.

Detailed description will be provided in the following in description of step S1202.

Optionally, a resource at a second fixed location in the PUCCH resource may be used to send the SR.

Optionally, the resource at the second fixed location in the PUCCH resource may be one of the following resources, i.e., a resource that is in the PUCCH resource and that is used for sending a CRC bit of CRC check coding before a target moment, where the target moment is a moment at which the to-be-sent uplink control information is encoded, or a resource element at a preset location in the PUCCH resource, or a resource element that is preset in the PUCCH resource and that is used to carry a reference signal.

Detailed description will be provided in the following in description of step S1203.

Optionally, the transceiver module 1602 may be specifically further configured to, when the processing module 1601 configures that the UE is not allowed to send a PUCCH and a PUSCH resource simultaneously, or when the processing module 1601 configures that the UE is allowed to send a PUCCH and a PUSCH simultaneously and the UE determines that no PUSCH is sent in the uplink subframe, receive the CSI, the HARQ-ACK, and the SR that are sent by the UE on the PUCCH resource in the uplink subframe using the first PUCCH format.

Detailed description will be provided in the following in description of step S1205.

Figure 5:
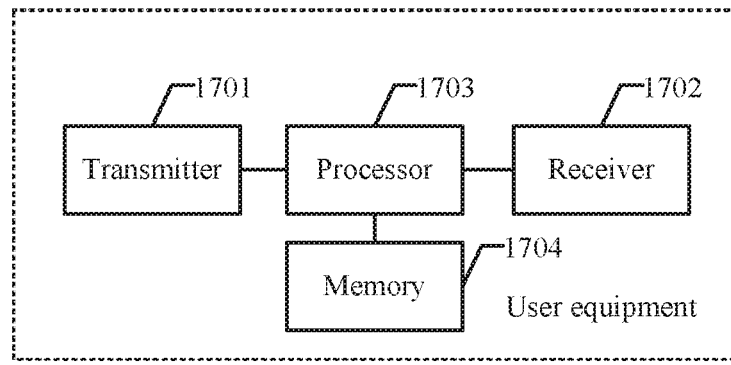
FIG. 5 is a schematic diagram of yet another UE according to an embodiment of the present invention.

FIG. 5 is another schematic structural diagram of a UE according to an embodiment of the present invention. The UE may include at least one receiver 1701, at least one transmitter 1702, at least one processor 1703, and at least one memory 1704.

The UE in this embodiment of the present invention may include more or fewer components than those shown in FIG. 5, or two or more components may be combined, or different component configuration or setting may be used. The components may be implemented in hardware including one or more signal processing and/or application-specific integrated circuits, software, or a combination of hardware and software.

Specifically, the transmitter 1702 may implement functions of sending operations of the transceiver module 1302 in the embodiment of FIG. 1 and the transceiver module 1402 in the embodiment of FIG. 2. The receiver 1701 may implement functions of receiving operations of the transceiver module 1302 in the embodiment of FIG. 1 and the transceiver module 1402 in the embodiment of FIG. 2. The processor 1703 may implement functions of the processing module 1301 in the embodiment of FIG. 1 and the processing module 1401 in the embodiment of FIG. 2.

Figure 6:
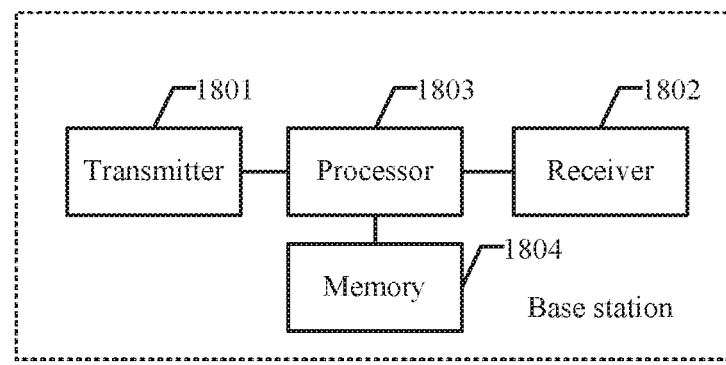
FIG. 6 is a schematic diagram of yet another eNB according to an embodiment of the present invention.

FIG. 6 is another schematic structural diagram of a base station (e.g., an eNB) according to an embodiment of the present invention. The eNB may include at least one receiver 1801, at least one transmitter 1802, at least one processor 1803, and at least one memory 1804.

The eNB in this embodiment of the present invention may include more or fewer components than those shown in FIG. 6, or two or more components may be combined, or different component configuration or setting may be used. The components may be implemented in hardware including one or more signal processing and/or application-specific integrated circuits, software, or a combination of hardware and software.

Specifically, the transmitter 1802 may implement functions of sending operations of the transceiver module 1502 in the embodiment of FIG. 3 and the transceiver module 1602 in the embodiment of FIG. 4. The receiver 1801 may implement functions of receiving operations of the transceiver module 1502 in the embodiment of FIG. 3 and the transceiver module 1602 in the embodiment of FIG. 4. The processor 1803 may implement functions of the processing module 1501 in the embodiment of FIG. 3 and the processing module 1601 in the embodiment of FIG. 4.

Figure 7:
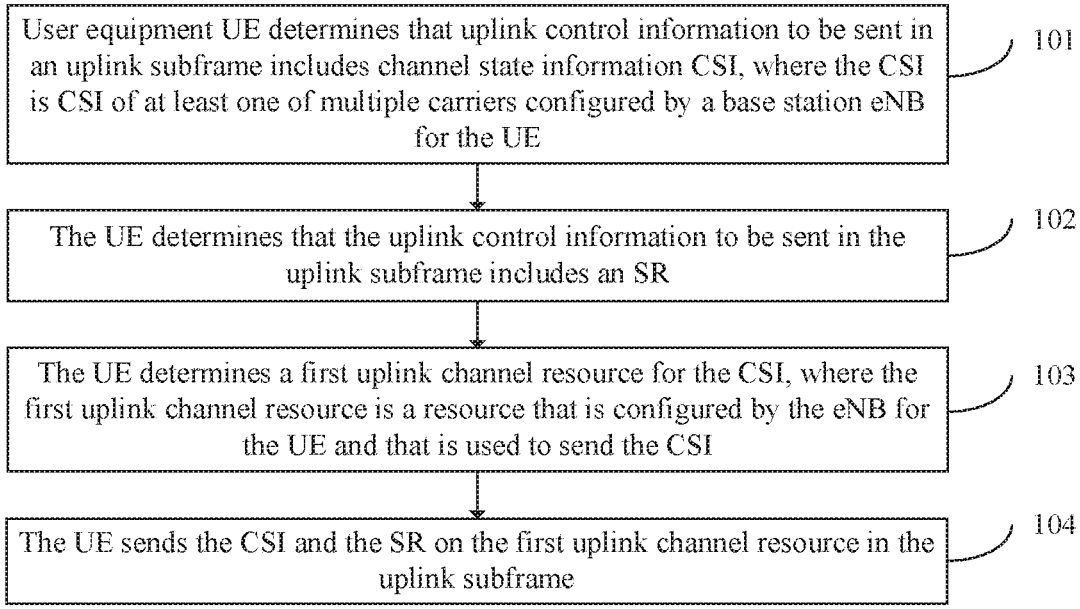
FIG. 7 is a schematic diagram of an uplink control information sending method according to an embodiment of the present invention.

Referring to FIG. 7, an embodiment of an uplink control information sending method includes the following steps.

101. A UE determines that uplink control information to be sent in an uplink subframe includes channel state information (CSI), where the CSI is CSI of at least one of multiple carriers configured by a base station (e.g., an eNB) for the UE.

To improve efficiency of data transmission between the eNB and the UE, the eNB may generally configure multiple carriers for the UE. CSI of each carrier may include information such as a channel quality indicator (CQI), a rank indication (RI), a precoding matrix indicator (PMI), or a precoding type indicator (PTI). The CQI may be used to reflect channel quality of a downlink PDSCH. The RI may be used to indicate a quantity of valid data layers of the PDSCH. The PMI may be used to indicate an index of a codebook set. The PMI may be used to indicate an index of a precoding type. The eNB may need to obtain the CSI of each carrier, so that the eNB adjusts, according to the CSI of each carrier, scheduling of data transmission using the carriers, improving downlink data transmission efficiency. A minimum unit of data transmitted between the eNB and the UE may be a subframe. A subframe used by the UE to send data to the eNB is an uplink subframe, and the uplink subframe carries uplink control information that the UE needs to send to the eNB. Because the CSI of each carrier is not necessarily sent each time the UE exchanges data with the eNB, the UE needs to determine that the uplink control information to be sent in the uplink subframe includes CSI.

102. The UE determines that the uplink control information to be sent in the uplink subframe includes an SR.

The UE may need to send, to the eNB in a subframe used to send an SR status, information indicating whether the UE has an uplink data scheduling request. When the UE has an uplink data scheduling request, the UE sends, to the eNB using the uplink subframe, an SR indicating that there is a data scheduling request. When the UE has no uplink data scheduling request, the UE sends, to the eNB using the uplink subframe, an SR indicating that there is no data scheduling request. The UE may determine, using a parameter, e.g., sr-PUCCH-ResourceIndex sent by the eNB to the UE, the uplink subframe used to send a SR status. The UE may obtain a SR sending period $SR_{PERIODICITY}$ and a subframe offset $N_{OFFSET,SR}$ in the period using the parameter. The UE may determine, using a preset rule, whether the uplink subframe satisfies a subframe condition for sending the SR status, to determine whether the uplink control information to be sent in the uplink subframe includes an SR.

Specifically, the UE may determine, using the preset rule, whether the uplink subframe satisfies the subframe condition for sending the SR status. The preset rule may be $(10 \times n_f + \lfloor n_s/2 \rfloor - N_{OFFSET,SR})$ mod $SR_{PERIODICITY} = 0$, where $n_f$ is a system frame number, $n_s$ is a number of a slot in a subframe n in a system frame, $SR_{PERIODICITY}$ is an SR sending period, and $N_{OFFSET,SR}$ is a subframe offset of an SR in the period. $SR_{PERIODICITY}$ and $N_{OFFSET,SR}$ may be determined using the SR parameter sr-PUCCH-ResourceIndex that is configured by the eNB for the UE. If the subframe n satisfies the condition, the uplink control information to be sent in the uplink subframe includes an SR. If the subframe n does not satisfy the condition, the uplink control information to be sent in the uplink subframe does not include an SR. It should be noted that, an order for performing the step 101 and step 102 is not limited.

103. The UE determines a first uplink channel resource for the CSI, where the first uplink channel resource is a resource that is configured by the eNB for the UE and that is used to send the CSI.

The resource that is configured by the eNB for the UE and that is used to send the CSI may include a PUCCH resource or a PUSCH resource. The eNB may configure, for the UE, one or more PUCCH resources used to send the CSI, and the configured multiple PUCCH resources used to send the CSI may have different formats. The UE may determine, from the configured multiple PUCCH resources used to send the CSI, one PUCCH resource as the first uplink channel resource. Alternatively, the UE may determine, as the first uplink channel resource, a PUSCH resource scheduled by the eNB for a PUSCH of the UE that is sent in the uplink subframe.

104. The UE sends the CSI and the SR on the first uplink channel resource in the uplink subframe.

The UE determines, by performing step 101 and step 102, that the uplink control information to be sent in the uplink subframe includes the CSI and the SR, and after determining the first uplink channel resource by performing step 103, the UE sends the CSI and the SR on the first uplink channel resource in the uplink subframe. The SR is information indicating that the UE has an uplink data scheduling request or information indicating that the UE has no uplink data scheduling request.

In this embodiment of the present invention, the UE determines that the uplink control information to be sent in the uplink subframe includes the CSI and the SR, and the UE determines the first uplink channel resource used to send the CSI. The first uplink channel resource is a channel resource that has a format in which a resource at a fixed location is used to send the SR and that is used to send the CSI, and then the UE can send the CSI and the SR on the first uplink channel resource in the uplink subframe. In this way, the UE sends the CSI and the SR on the first uplink channel resource in the uplink subframe, thereby ensuring that the eNB can obtain the SR of the UE and can accurately obtain the CSI of each carrier, and improving accuracy of resource scheduling by the eNB for the UE.

As described in the foregoing embodiment, the UE sends the CSI and the SR on the first uplink channel resource in the uplink subframe. In actual application, the CSI may include periodic CSI and aperiodic CSI, and the first uplink channel resource may include a PUCCH resource and a PUSCH resource. When the CSI is the periodic CSI, the first uplink channel resource may be the PUCCH resource. When the CSI is the aperiodic CSI, the first uplink channel resource may be the PUSCH resource.

Figure 8:
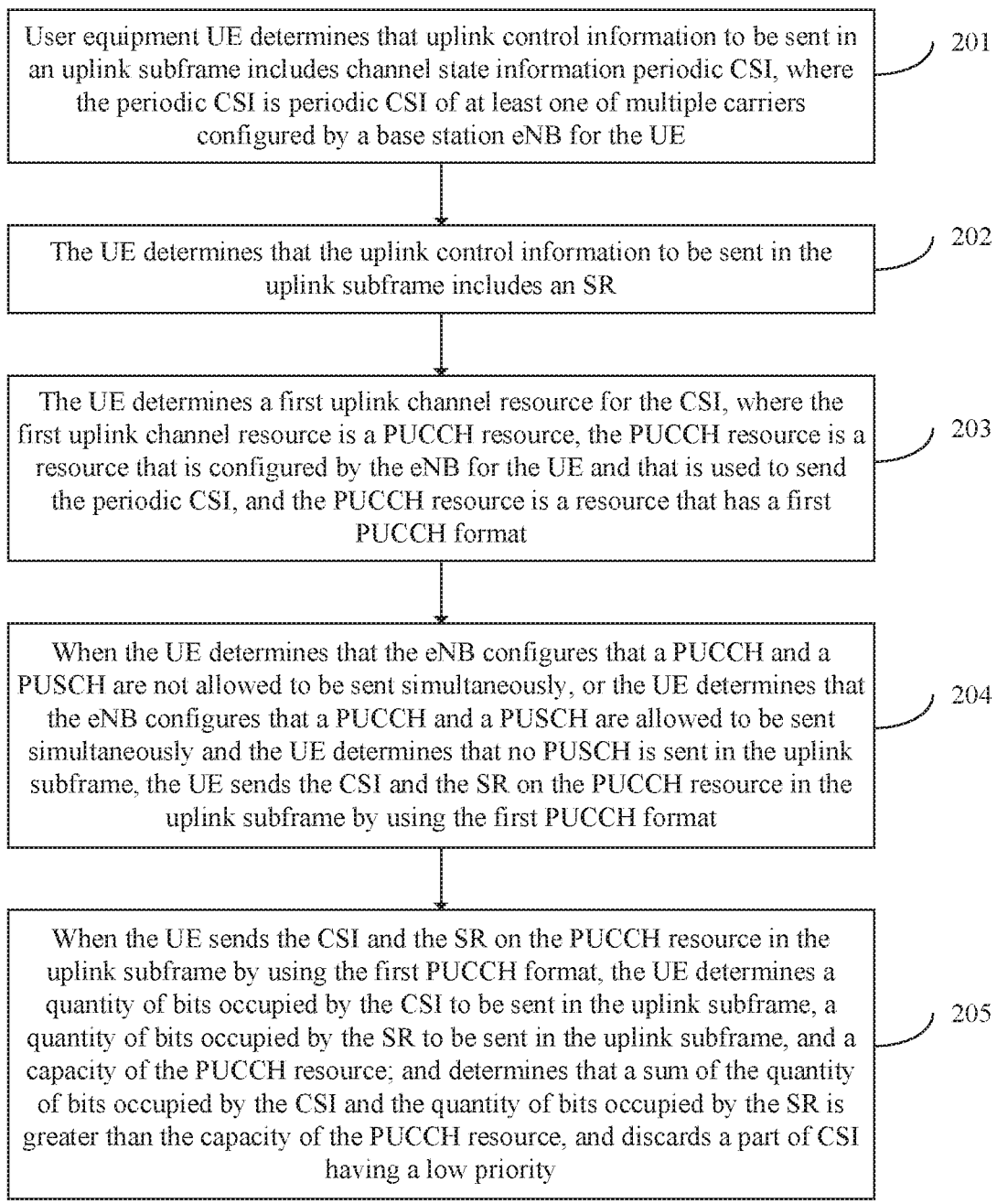
FIG. 8 is a schematic diagram of another uplink control information sending method according to an embodiment of the present invention.

Referring to FIG. 8, another embodiment of an uplink control information sending method includes the following steps. In this embodiment, CSI is periodic CSI.

201. A UE determines that uplink control information to be sent in an uplink subframe includes periodic CSI, where the periodic CSI is periodic CSI of at least one of multiple carriers configured by a base station (e.g., eNB) for the UE.

CSI information sent by the UE to the eNB may include periodic CSI information and aperiodic CSI information. For each downlink carrier, the eNB may configure, for the UE, a sending period of periodic CSI of each downlink carrier and a subframe offset value for sending the periodic CSI in the period. The UE may determine, using the sending period and the sending subframe offset value for the periodic CSI of each downlink carrier that are configured by the eNB, each uplink subframe in which the periodic CSI of each downlink carrier may be sent.

The UE may determine that the uplink control information to be sent in the uplink subframe includes the periodic CSI. Specifically, the UE may determine, using the pre-obtained sending period and the pre-obtained sending subframe offset value for the periodic CSI of each downlink carrier that are configured by the base station for the UE, whether the periodic CSI needs to be sent in the uplink subframe, and the UE may determine, according to a determining result, that the periodic CSI of the at least one of the multiple carriers configured by the eNB for the UE needs to be sent in the uplink subframe.

202. The UE determines that the uplink control information to be sent in the uplink subframe includes an SR.

Detailed description has been provided in description of S102. It should be noted that, an order for performing step 201 and step 202 is not limited herein.

203. The UE determines a first uplink channel resource for the CSI, where the first uplink channel resource is a PUCCH resource, the PUCCH resource is a resource that is configured by the eNB for the UE and that is used to send the periodic CSI, and the PUCCH resource is a resource that has a first PUCCH format.

Specifically, the first PUCCH format may be any one of the foregoing new PUCCH format 1 to new PUCCH format 6.

In one embodiment of the first PUCCH format, a capacity of the first PUCCH format is greater than a preset bit quantity, and the preset bit quantity is 11. The capacity is a maximum quantity of bits of uplink control information that can be sent on the channel resource. The preset bit is a capacity of a second PUCCH format. The second PUCCH format is a PUCCH format 2 having a capacity of 11 bits. In an embodiment of the PUCCH format 2, for a normal cyclic prefix (CP), only 20-bit CSI information is carried; for an extended CP, not only 20-bit CSI information is carried, but also 1-bit or 2-bit acknowledgment (ACKnowledge, or ACK)/negative acknowledgment (NACKnowledge, or NACK) information is carried. Both the normal CP and the extended CP use QPSK modulation. In an embodiment of a channel structure of the PUCCH format 2, in a case of the normal CP, the second and the sixth symbols in each location slot of an RB for transmitting the PUCCH format 2 are used to transmit a demodulation reference signal (Demodulation-Reference Symbol, or DM-RS), and the remaining five symbols are used to transmit a PUCCH. In a case of the extended CP, each slot has only six symbols. In this case, only one symbol (the fourth symbol) is used to transmit a DM-RS, and the remaining five symbols are used to transmit a PUCCH. A channel quality information (e.g., Channel Quality Indicator (CQI)) resource configured for the UE may be configured using a "cqi-PUCCH-ResourceIndex" of a CQI-PUCCH-resource index information element in a CQI period configuration "CQI-ReportPeriodic" message.

In another embodiment of the first PUCCH format, the first PUCCH format is encoded using a convolutional code. A quantity of bits of uplink control information that can be sent on a PUCCH resource that has the first PUCCH format is greater than a quantity of bits of uplink control information that can be sent on a PUCCH resource that has the second PUCCH format. For the quantity of bits of the uplink control information that can be sent on the PUCCH that has the first PUCCH format, a higher coding gain may be obtained by means of convolutional coding than Reed Muller (RM) coding.

The PUCCH resource that has the first PUCCH format may be configured as a resource used to send the CSI, and when the uplink control information to be sent in the uplink subframe includes an SR, a resource at a fixed location in the PUCCH resource may be used to send the SR.

The UE may send the CSI and the SR on the PUCCH resource in the uplink subframe using the first PUCCH format. The resource at the fixed location in the PUCCH resource may be one of the following resources, i.e., a resource that is in the PUCCH resource and that is of a bit at any location before a target moment, where the target moment is a moment at which to-be-sent uplink control information is encoded, or optionally, a resource that is in the PUCCH resource and that is of the first bit before the target moment, or a resource that is in the PUCCH resource and that is for a CRC bit of cyclic redundancy check (CRC) coding before a target moment, where the target moment is a moment at which the to-be-sent uplink control information is encoded, or a resource element at a preset location in the PUCCH resource, or a resource element that is preset in the PUCCH resource and that is used to carry a reference signal.

Specifically, the resource at the fixed location in the PUCCH resource may be a resource that is in the PUCCH resource and that is of a bit at any location before a target moment, where the target moment is a moment at which the to-be-sent uplink control information is encoded. Optionally, the resource at the fixed location in the PUCCH resource may be a resource that is in the PUCCH resource and that is of the first bit before the target moment. Before the uplink control information is sent on the PUCCH resource, channel coding may first be performed on the uplink control information, and then coded data is modulated and sent. When the CSI and the SR are sent on the PUCCH resource, the CSI information and information indicating that the UE has an uplink data scheduling request or has no uplink data scheduling request may be cascaded, channel coding may first be performed, and then coded data may be modulated and sent. The resource at the fixed location in the PUCCH resource being a resource that is in the PUCCH resource and that is of a bit at any location before a target moment means that a fixed location in the resource is used for carrying SR information during information cascading of the SR information and the CSI information. For example, the fixed location carries information about the first bit.

Specifically, the resource at the fixed location in the PUCCH resource may be a resource that is in the PUCCH resource and that is for a CRC bit of CRC check coding before a target moment, where the target moment is a moment at which the to-be-sent uplink control information is encoded. Before the uplink control information is sent on the PUCCH resource, channel coding may first be performed on the uplink control information, and then coded data may be modulated and sent. Before channel coding is performed on the uplink control information, a CRC may first need to be added to the uplink control information, and then channel coding is performed on both the uplink control information and CRC information. That the resource at the fixed location in the PUCCH resource is a resource that is in the PUCCH resource and that is for a CRC bit of CRC check coding before a target moment means that a CRC check code is first added to the CSI information, and then a resource of the CRC check code is used to send the SR, that is, the resource of the CRC check code is used to send both the CRC information and the SR. The SR information may be sent on the resource at the fixed location in a scrambling manner, where an exclusive OR operation is performed on the SR information and the CRC check code.

Specifically, the resource at the fixed location in the PUCCH resource may be a resource element at a preset location in the PUCCH resource. Before the uplink control information is sent on the PUCCH resource, channel coding may first be performed on the uplink control information, and then coded data may be modulated and sent. A coded modulated symbol may be mapped to a resource element of the PUCCH resource using a predefined rule. A resource element at a preset time-frequency location in the PUCCH resource may be any particular resource element of the PUCCH resource that is used to send the SR. For example, six resource elements having a lowest frequency in the third time domain symbol in the PUCCH resource may be predefined to map the SR.

Specifically, the resource at the fixed location in the PUCCH resource may be a resource element that is preset in the PUCCH resource and that is used to carry a reference signal. When the uplink control information is sent on the PUCCH resource, a reference signal for demodulating the uplink control information needs to be sent on the resource element that is preset in the PUCCH resource and that is used to send the reference signal. The SR may be sent on the preset resource that is used to carry the reference signal. The reference signal may be a constant amplitude zero autocorrelation (CAZAC) sequence. The SR may be sent using the sequence of the reference signal. For example, when the SR indicates that the UE has an uplink data scheduling request, a first reference signal sequence may be sent on the preset reference signal resource element in the PUCCH resource. When the SR indicates that the UE has no uplink data scheduling request, a second reference signal sequence may be sent on the preset reference signal resource element in the PUCCH resource. That is, a reference signal sequence sent on the preset reference signal resource element in the PUCCH resource may be used to demodulate the uplink control information on the PUCCH resource, and the SR information may be sent according to whether the reference signal sequence is the first reference signal sequence or the second reference signal sequence. Optionally, the SR information may alternatively be scramble with the reference signal sequence using an exclusive OR operation and sent on the resource at the fixed location.

204. When the UE determines that the eNB configures that a PUCCH and a PUSCH are not allowed to be sent simultaneously, or when the UE determines that the eNB configures that a PUCCH and a PUSCH are allowed to be sent simultaneously and that no PUSCH is sent in the uplink subframe, the UE sends the CSI and the SR on the PUCCH resource in the uplink subframe using the first PUCCH format.

Before sending the CSI and the SR on the PUCCH resource in the uplink subframe using the first PUCCH format, the UE may need to determine whether the eNB configures that the UE is allowed to send a PUCCH and a PUSCH simultaneously or that the UE is not allowed to send a PUCCH and a PUSCH simultaneously. If the eNB configures that the UE is allowed to send a PUCCH and a PUSCH simultaneously and there is a PUSCH to be sent in the uplink subframe, the UE may send the CSI on the PUSCH to be sent, and simultaneously send the SR on a resource that is configured by the eNB for the UE and that is used to send the SR. If the eNB configures that a PUCCH and a PUSCH are not allowed to be sent simultaneously, or the UE determines that the eNB configures that a PUCCH and a PUSCH are allowed to be sent simultaneously and the UE determines that no PUSCH is sent in the uplink subframe, the UE sends the CSI and the SR on the PUCCH resource in the uplink subframe using the first PUCCH format.

Optionally, the UE may further determine a second uplink channel resource, where the second uplink channel resource is a resource that is configured by the eNB for the UE and that is used to send the SR.

In a similar embodiment of the present invention, the UE may determine whether a format of the first uplink channel resource is the first PUCCH format or the second PUCCH format. When the UE determines that the first uplink channel resource is a PUCCH resource that has the second PUCCH format, the UE further may determine the second uplink channel resource, and send the SR on the second uplink channel resource in the uplink subframe, and the UE does not send the CSI. The second uplink channel resource may be a resource that is configured for the UE and that is used to send the SR. Because the first uplink channel resource is the PUCCH resource that has the second PUCCH format, the PUCCH resource does not support simultaneous sending of the CSI and the SR. Therefore, the UE cannot send the CSI and the SR simultaneously. Considering that the SR is more important than the CSI, the UE may not send the CSI, but sends the SR on the second uplink channel resource. The second PUCCH format may be the foregoing PUCCH format 2. However, when the UE determines that the first uplink channel resource is a PUCCH resource that has the first PUCCH format, the UE sends the CSI and the SR on the first uplink channel resource in the uplink subframe.

Optionally, the UE may determine a second uplink channel resource, where the second uplink channel resource is a resource that is configured by the eNB for the UE and that is used to send the SR. When the UE determines that the first uplink channel resource is a PUCCH resource that has the first PUCCH format, if the UE also determines that it is configured that the SR is not allowed to be sent on the first uplink channel resource that has the first PUCCH format, the UE sends the SR on the second uplink channel resource in the uplink subframe, and the UE does not send the CSI.

205. When the UE sends the CSI and the SR on the PUCCH resource in the uplink subframe using the first PUCCH format, the UE may determine a quantity of bits occupied by the CSI to be sent in the uplink subframe, a quantity of bits occupied by the SR to be sent in the uplink subframe, and a capacity $N_a$ of the PUCCH resource. The UE may also determine that a sum $N_1$ of the quantity of bits occupied by the CSI and the quantity of bits occupied by the SR is greater than the capacity $N_a$ of the PUCCH resource, and discard $N_2$ bits of CSI that has a low priority, where $N_2$ satisfies $N_1-N_2 \leq N_a$.

It is assumed that periodic CSI information needs to be fed back for a total of L carriers configured by the eNB for the UE. It is assumed that quantities of bits of periodic CSI that needs to be fed back for the carriers in a subframe # n are $N_{subframe\_n-cc\_1}$, $N_{subframe\_n-cc\_2}$, . . . , and $N_{subframe\_n-cc\_L}$, where $0 \leq N_{subframe\_n-cc\_N}$ (N=1, 2, . . . L)$\leq N_{max}$, and $N_{max}$ is a maximum quantity of bits of periodic CSI that is fed back for one carrier. That is, in the subframe # n, it is configured that a quantity of bits of periodic CSI that is fed back by the UE is $$N_0 = \sum_{l=1}^{L} N_{subframe\_n-cc\_l},$$

where $N_0$ is a total quantity of bits of periodic CSI that needs to be fed back in the current subframe for the carriers that are configured by the eNB for the UE by means of radio resource control (RRC) and that are in an active state, that is, $$N_0 = \sum_{l=1}^{L} N_{subframe\_n-cc\_l}.$$

The quantity L of the carriers is a quantity of carriers that are currently configured for the UE by means of RRC and that are in the active state.

One bit may be preset to send the SR, that is, the quantity of bits occupied by the SR is 1. The capacity of the PUCCH resource may be obtained using configuration information from the eNB for the UE. The capacity of the PUCCH resource may be a maximum value of a quantity of bits of uplink control information that can be sent on the PUCCH resource. When the sum $N_1$ of the quantity of bits occupied by the CSI and the quantity of bits occupied by the SR is greater than the capacity $N_a$ of the PUCCH resource, the UE cannot send all of the CSI and the SR to the eNB using the PUCCH resource. When the SR has a higher priority than the CSI, the SR needs to be sent. There may be one or more pieces of CSI having relatively low priorities in multiple pieces of CSI, and therefore $N_2$ pieces of CSI having low priorities may be discarded based on the priorities of the CSI, such that $N_1-N_2 \leq N_a$.

In this embodiment of the present invention, the CSI is periodic CSI, and the first uplink channel resource is a PUCCH resource. When the PUCCH resource is the resource that has the first PUCCH format, the UE can send the CSI and the SR on the PUCCH resource in a same uplink subframe. When the capacity of the PUCCH resource is less than the sum of the quantity of bits occupied by the to-be-sent CSI and the quantity of bits occupied by the to-be-sent SR, a part of CSI having a low priority is discarded. This ensures that the UE can send important uplink control information, that is, the SR, and the UE can also send periodic CSI information as much as possible, and thus, improves accuracy of resource scheduling by the eNB for the UE. When the PUCCH resource determined by the UE is the resource that has the second PUCCH format, because the SR cannot be sent on the resource that has the second PUCCH format, the UE determines the second uplink channel resource that is configured by the eNB for the UE and that is used to send the SR, and sends the SR on the second channel resource, and the UE does not send the CSI. This ensures that the SR can be sent to the eNB, and ensures efficiency of data exchange between the eNB and the UE.

Figure 9:
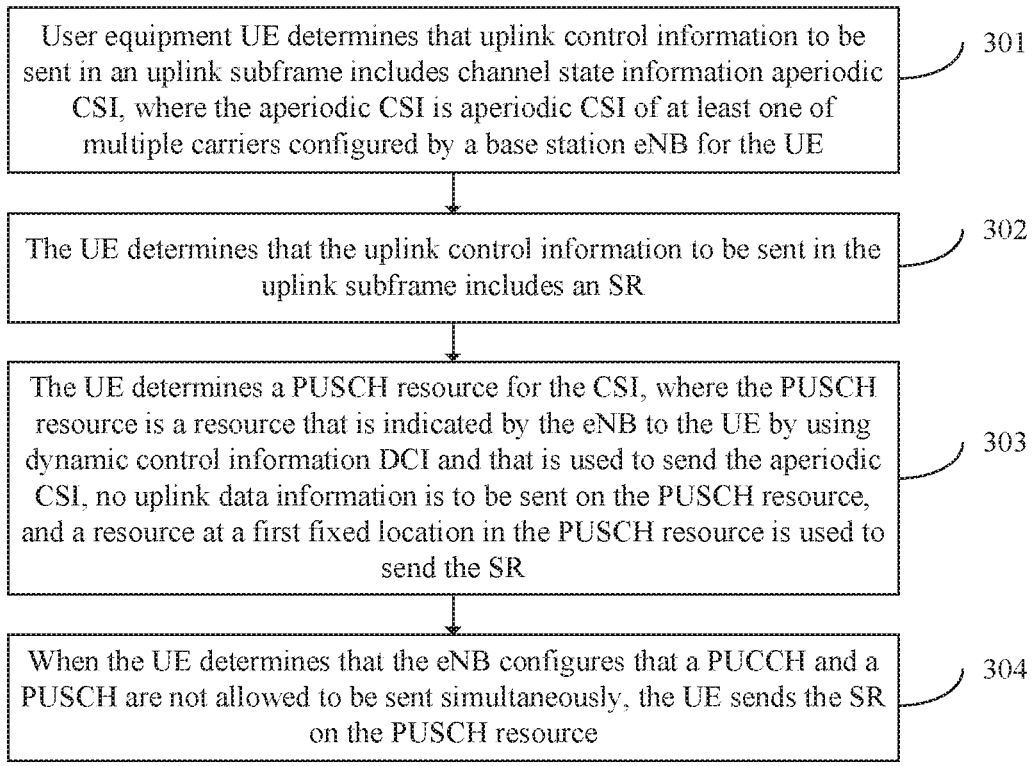
FIG. 9 is a schematic diagram of yet another uplink control information sending method according to an embodiment of the present invention.

As described in the foregoing embodiment, the CSI is periodic CSI, and the first uplink channel resource is a PUCCH resource. When the CSI is aperiodic CSI, the first uplink channel resource may be a PUSCH resource. Referring to FIG. 9, another embodiment of an uplink control information sending method includes the following steps, where the CSI is aperiodic CSI.

301. A UE determines that uplink control information to be sent in an uplink subframe includes aperiodic CSI, where the aperiodic CSI is aperiodic CSI of at least one of multiple carriers configured by a base station (e.g., an eNB) for the UE.

The eNB may trigger, using a "CSI request" control bit in dynamic control information (DCI), the UE to send the aperiodic CSI on a PUSCH channel. The UE may determine, using a value of the "CSI request" bit in the received dynamic control information for scheduling the PUSCH, that the uplink control information to be sent in the uplink subframe includes the aperiodic CSI. The aperiodic CSI is aperiodic CSI of at least one of multiple carriers configured by the eNB for the UE.

302. The UE determines that the uplink control information to be sent in the uplink subframe includes an SR.

Detailed description has been provided in description of S102. of S102. It should be noted that, an order for performing step 301 and step 302 is not limited herein.

303. The UE determines a PUSCH resource for the CSI, where the PUSCH resource is a resource that is indicated by the eNB to the UE using DCI and that is used to send the aperiodic CSI. In this example, no uplink data information is to be sent on the PUSCH resource, and a resource at a first fixed location in the PUSCH resource may be used to send the SR.

A method for determining, by the UE, that the uplink channel resource is a PUSCH resource, and no uplink data information is to be sent on the PUSCH resource is described as follows.

The UE may receive uplink scheduling indication information, and if the uplink scheduling indication information has a DCI format 0, the UE determines that a "CSI request" field in the uplink scheduling indication information indicates that reporting of the aperiodic CSI is triggered. If a "modulation and coding scheme and redundancy version" field in the uplink scheduling indication information is 29 ($I_{MCS}$=29), and a quantity of RBs of uplink data scheduled by the scheduling indication information is less than a first threshold, the UE determines that the uplink channel resource is a PUSCH resource, and no uplink data information is to be sent on the PUSCH resource.

Alternatively, if the uplink scheduling indication information has a DCI format 4, but only one transport block in the uplink scheduling indication information is enabled, the UE may determine that a "CSI request" field in the uplink scheduling indication information indicates that reporting of the aperiodic CSI is triggered. If a "modulation and coding scheme and redundancy version" field corresponding to the enabled transport block in the uplink scheduling indication information is 29 ($I_{MCS}$=29), and a quantity of RBs of uplink data scheduled by the scheduling indication information is less than a first threshold, the UE determines that the uplink channel resource is a PUSCH resource, and no uplink data information is to be sent on the PUSCH resource.

The resource at the first fixed location may be any one of the following resources, i.e., a resource that is in the PUSCH resource and that is of any bit before a target moment, where the target moment is a moment at which the to-be-sent uplink control information is encoded, or optionally, a resource that is in the PUSCH resource and that is of the first bit before the target moment, or a resource that is in the PUSCH resource and that is used for sending a CRC bit of CRC check coding before a target moment, where the target moment is a moment at which the to-be-sent uplink control information is encoded, or a resource element at a preset location in the PUSCH resource, or a resource element that is preset in the PUSCH resource and that is used to carry a reference signal.

The resource at the first fixed location in the PUSCH resource may include a resource similar to that at the first fixed location in the PUCCH resource that is described in step 203, and details are not described again.

304. When the UE determines that the eNB configures that a PUCCH and a PUSCH are not allowed to be sent simultaneously, the UE sends the SR on the PUSCH resource.

Before sending the CSI and the SR on the PUSCH resource, the UE may need to determine whether the eNB configures that the UE is allowed to send a PUCCH and a PUSCH simultaneously or is not allowed to send a PUCCH and a PUSCH simultaneously. If it is configured that a PUCCH and a PUSCH are not allowed to be sent simultaneously, the SR and the CSI are sent on the PUSCH resource. If it is configured that a PUCCH and a PUSCH are allowed to be sent simultaneously, the UE may send the CSI on the PUSCH and simultaneously send the SR on a resource that is configured by the eNB for the UE and that is used to send the SR.

Optionally, the UE may further determine a second uplink channel resource, where the second uplink channel resource is a resource that is configured by the eNB for the UE and that is used to send the SR. When the UE determines that it is configured that the SR is not allowed to be sent on the PUSCH resource, the UE sends the SR on the second uplink channel resource in the uplink subframe, and the UE does not send the CSI.

Optionally, when the UE determines that the uplink control information to be sent in the uplink subframe further includes a hybrid automatic repeat request acknowledgment (HARQ-ACK), the UE may send the CSI, the SR, and the HARQ-ACK information on the PUSCH resource in the uplink subframe. The HARQ-ACK is acknowledgment information or negative acknowledgment information corresponding to a downlink data channel.

A resource at a second fixed location may be set in the PUSCH resource to send status information of the HARQ-ACK.

The resource at the second fixed location may be one of the following resources, i.e., a resource that is in the PUSCH resource and that is of any N bits before a target moment, where the target moment is a moment at which the to-be-sent uplink control information is encoded, and a value of N is a quantity of bits of the HARQ-ACK, or optionally, a resource that is in the PUSCH resource and that is of the second to the $(N+1)^{th}$ bits before the target moment, where a resource that is in the PUSCH resource and that is of the first bit before the target moment is used to send the SR, or a resource element at a preset location in the PUSCH resource.

Specifically, the resource at the second fixed location in the PUSCH resource may be a resource that is in the PUSCH resource and that is of N bits at any location before a target moment, where the target moment is a moment at which the to-be-sent uplink control information is encoded. Optionally, the resource at the second fixed location may be a resource that is in the PUSCH resource and that is of the second to the $(N+1)^{th}$ bits before the target moment. Before the uplink control information is sent on the PUSCH resource, channel coding may be first performed on the uplink control information, and then coded data may be modulated and sent. That the resource at the second fixed location in the PUSCH resource is a resource that is in the PUSCH resource and that is of N bits at any location before a target moment means that a resource of N bits at a fixed location in the resource is used for the HARQ-ACK information during information cascading of the SR, the HARQ-ACK, and the CSI. For example, the fixed location may be the second to the $(N+1)^{th}$ bits.

Optionally, the resource at the fixed location in the PUSCH resource may be a resource element at a preset time-frequency location in the PUSCH resource. Before the uplink control information is sent on the PUSCH resource, channel coding may first be performed on the uplink control information, and then coded data may be modulated and sent. A coded modulated symbol may be mapped to a resource element of the PUSCH resource using a predefined rule. The resource element at the preset time-frequency location in the PUSCH resource means that a particular resource element of the PUSCH resource is used to send the HARQ-ACK. For example, a resource element of the sixth time domain symbol in the PUCCH resource may be pre-defined to map the HARQ-ACK.

In this embodiment of the present invention, the CSI is aperiodic CSI, the first uplink channel resource is a PUSCH resource, and no uplink data information is to be sent on the PUSCH resource. The SR is sent on the resource at the first fixed location in the PUSCH resource. In this way, when the UE is instructed to send the aperiodic CSI and no uplink data is to be sent, the UE can send the CSI and the SR on the PUSCH resource in a same uplink subframe, instead of discarding the CSI and sending only the SR on the resource that is configured by the eNB for the UE and that is used to send the SR, thereby improving accuracy of resource scheduling by the eNB for the UE.

Figure 10:
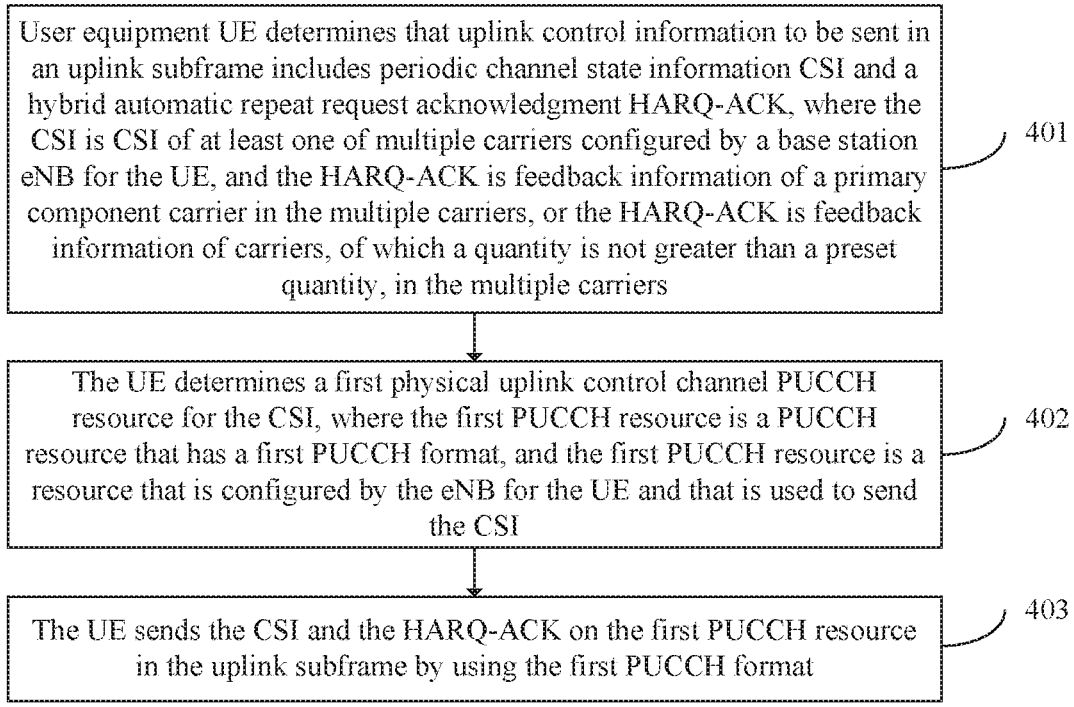
FIG. 10 is a schematic diagram of yet another uplink control information sending method according to an embodiment of the present invention.

As described in the foregoing embodiment, the UE sends the CSI and the SR to the eNB in a same uplink subframe. In actual application, the UE may further need to send CSI and an HARQ-ACK to the eNB in a same uplink subframe. Referring to FIG. 10, another embodiment of an uplink control information sending method includes the following steps, where CSI and an HARQ-ACK may be sent to the eNB in a same uplink subframe.

401. A UE determines that uplink control information to be sent in an uplink subframe includes periodic channel state information (CSI) and a hybrid automatic repeat request acknowledgment (HARQ-ACK), where the CSI is CSI of at least one of multiple carriers configured by a base station (e.g., an eNB) for the UE, and the HARQ-ACK is feedback information of a primary component carrier in the multiple carriers, or the HARQ-ACK is feedback information of carriers whose quantity is not greater than a preset quantity in the multiple carriers.

For detailed description of determining, by the UE, that the uplink control information to be sent in the uplink subframe includes the periodic CSI, refer to description of 201.

The HARQ-ACK is acknowledgment information or negative acknowledgment information corresponding to a downlink data channel. Specifically, when receiving, on at least one downlink carrier, downlink data sent by the eNB, the UE needs to feed back, in the uplink subframe, an HARQ-ACK corresponding to the downlink data transmission, to ensure accuracy and timeliness of data exchange between the UE and the eNB. The HARQ-ACK may be feedback information of a primary component carrier in the multiple carriers, that is, the UE needs to feed back, in the uplink subframe, HARQ-ACK information for the downlink data transmission on the primary component carrier. The HARQ-ACK may also be feedback information of carriers whose quantity is not greater than a preset quantity in the multiple carriers, that is, the UE needs to feed back, in the uplink subframe, HARQ-ACK information for the downlink data transmission on the carriers of which the quantity is not greater than the preset quantity. The preset quantity may be 5.

402. The UE determines a first physical uplink control channel (PUCCH) resource for the CSI, where the first PUCCH resource is a PUCCH resource that has a first PUCCH format, and the first PUCCH resource is a resource that is configured by the eNB for the UE and that is used to send the CSI.

Specifically, the first PUCCH format may be any one of the foregoing new PUCCH format 1 to new PUCCH format 6.

In one embodiment of the first PUCCH format, a capacity of the first PUCCH format is greater than a preset bit quantity, and the preset bit quantity is 11. The capacity is a maximum quantity of bits of uplink control information that can be sent on the channel resource. The preset bit is a capacity of a second PUCCH format. The second PUCCH format may be the foregoing PUCCH format 2 having a capacity of 11 bits.

In another embodiment of the first PUCCH format, the first PUCCH format may be encoded using a convolutional code. A quantity of bits of uplink control information that can be sent on a PUCCH resource that has the first PUCCH format is greater than a quantity of bits of uplink control information that can be sent on a PUCCH resource that has the second PUCCH format. For the quantity of bits of the uplink control information that can be sent on the PUCCH that has the first PUCCH format, a higher coding gain can be obtained by means of convolutional coding than Reed Muller (RM) coding.

403. The UE sends the CSI and the HARQ-ACK on the first PUCCH resource in the uplink subframe using the first PUCCH format.

The UE sends the CSI and the HARQ-ACK on the first PUCCH resource in the uplink subframe using the first PUCCH format. When the CSI and the HARQ-ACK are sent on the PUCCH resource that has the first PUCCH format, a resource at a first fixed location in the PUCCH resource may be used to send the HARQ-ACK. The resource at the fixed location in the PUCCH resource may be a resource that is in the PUCCH resource and that is of N bits at any location before a target moment, where the target moment is a moment at which the to-be-sent uplink control information is encoded. Optionally, the resource at the second fixed location may be a resource that is in the PUSCH resource and that is of the second to the $(N+1)^{th}$ bits before the target moment. The resource at the fixed location in the PUCCH resource may also be a resource element at a preset time-frequency location in the PUCCH resource.

Specifically, the resource at the fixed location in the PUCCH resource may be a resource that is in the PUCCH resource and that is of N bits at any location before a target moment, where the target moment is a moment at which the to-be-sent uplink control information is encoded. Optionally, the resource at the second fixed location may be a resource that is in the PUSCH resource and that is of the second to the $(N+1)^{th}$ bits before the target moment. Before the uplink control information is sent on the PUCCH resource, channel coding may be first performed on the uplink control information, and then coded data is modulated and sent. When the CSI and the HARQ-ACK are sent on the PUCCH resource, the HARQ-ACK information and the CSI information may be cascaded, channel coding may first be performed, and then coded data is modulated and sent. The resource at the fixed location in the PUCCH resource is a resource that is in the PUCCH resource and that is of N bits at any location before a target moment, that is, N fixed locations in the resource may be used for the HARQ-ACK information during information cascading of the HARQ-ACK information and the CSI information. For example, the fixed locations may be optional, and the resource at the second fixed location may be the resource of the second to the $(N+1)^{th}$ bits.

Specifically, the resource at the fixed location in the PUCCH resource may be a resource element at a preset time-frequency location in the PUCCH resource. Before the uplink control information is sent on the PUCCH resource, channel coding may first be performed on the uplink control information, and then coded data is modulated and sent. A coded modulated symbol may be mapped to a resource element of the PUCCH resource using a predefined rule. When the resource at the fixed location in the PUCCH resource is the resource element at the preset time-frequency location in the PUCCH resource, a particular resource element of the PUCCH resource may be used to send the HARQ-ACK. For example, six resource elements having a lowest frequency in the third and the fifth time domain symbols in the PUCCH resource may be predefined to map the HARQ-ACK.

When the UE determines that the HARQ-ACK is the feedback information of the primary component carrier in the multiple carriers, or the HARQ-ACK is the HARQ-ACK information of the carriers whose quantity is not greater than the preset quantity in the multiple carriers, according to the prior art, the UE sends the HARQ-ACK on a second PUCCH channel resource that is configured by the eNB for the UE, and does not send the CSI. The second PUCCH channel resource is a resource that has a third PUCCH format, and the third PUCCH format is the foregoing PUCCH format 1a or PUCCH format 1b or PUCCH format 3. The preset quantity of carriers is 5. Because no CSI or only CSI of a maximum of one carrier can be sent on the second PUCCH resource that has the third PUCCH format, downlink data scheduling by the eNB for the UE is affected.

In this embodiment of the present invention, the UE determines that the uplink control information to be sent in the uplink subframe includes the CSI and the HARQ-ACK. When the HARQ-ACK is the feedback information of the primary component carrier in the multiple carriers, or the HARQ-ACK is the HARQ-ACK of the carriers whose quantity is not greater than the preset quantity in the multiple carriers, the UE determines the first PUCCH resource for the CSI. The first PUCCH resource is the PUCCH resource that has the first PUCCH format, and the first PUCCH resource is the resource that is configured by the eNB for the UE and that is used to send the CSI. Then the UE may send the CSI and the HARQ-ACK on the first PUCCH resource in the uplink subframe using the first PUCCH format. In this way, the UE can send not only the HARQ-ACK but also the CSI on the first PUCCH resource, thereby ensuring accuracy and timeliness of data exchange between the eNB and the UE, and improving accuracy of resource scheduling by the eNB for the UE.

Figure 11:
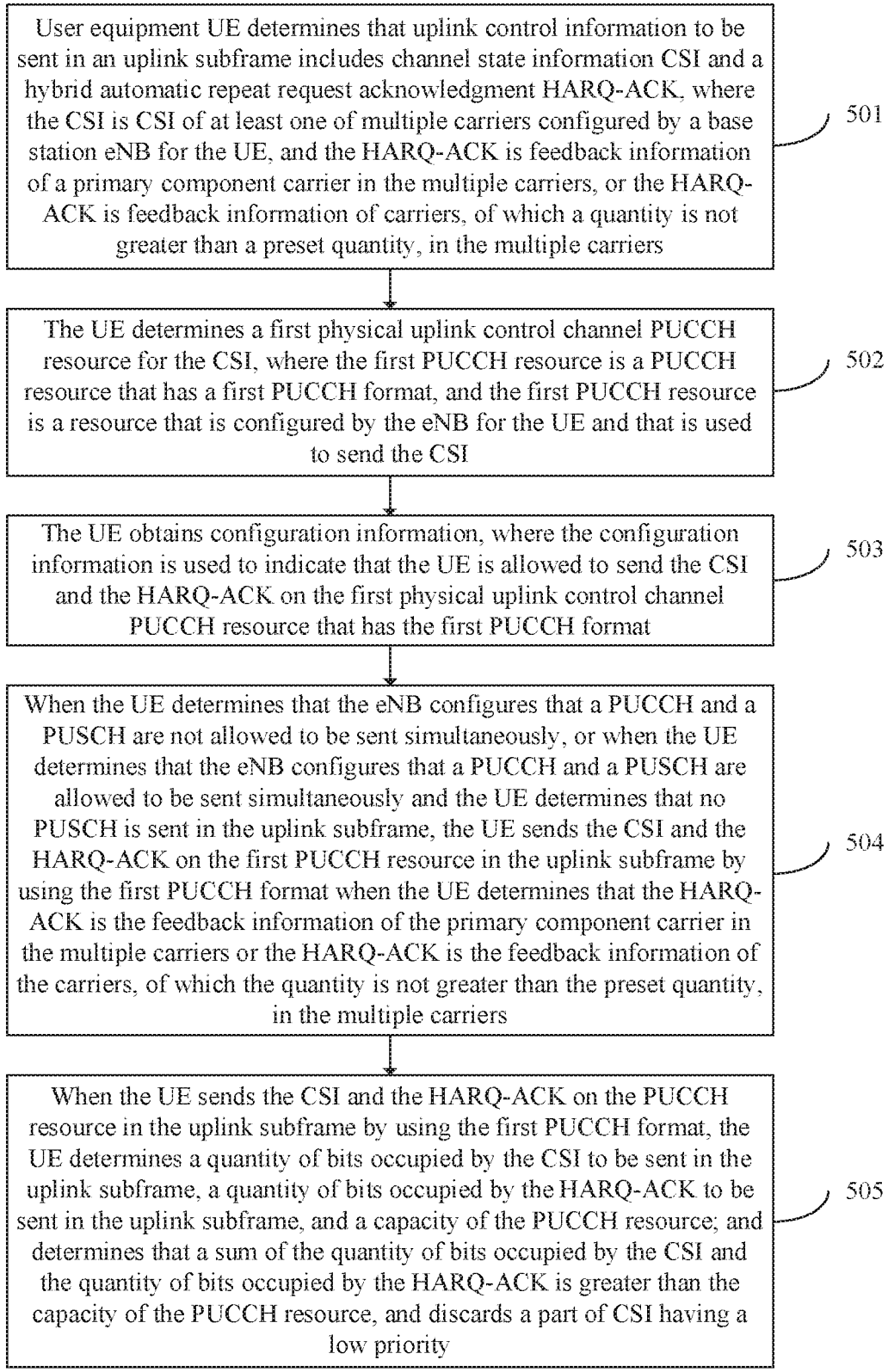
FIG. 11 is a schematic diagram of yet another uplink control information sending method according to an embodiment of the present invention.

As described in the foregoing embodiment, the first PUCCH resource is a PUCCH resource that has a first PUCCH format, and the first PUCCH resource is a resource that is configured by the eNB for the UE and that is used to send the CSI. Referring to FIG. 11, another embodiment of an uplink control information sending method includes the following steps.

501. A UE determines that uplink control information to be sent in an uplink subframe includes channel state information (CSI) and a hybrid automatic repeat request acknowledgment (HARQ-ACK), where the CSI is CSI of at least one of multiple carriers configured by a base station (e.g., an eNB) for the UE, and the HARQ-ACK is feedback information of a primary component carrier in the multiple carriers, or the HARQ-ACK is feedback information of less than a preset quantity of carriers in the multiple carriers. Detailed description may be referred to description of S401.

502. The UE determines a first physical uplink control channel (PUCCH) resource for the CSI, where the first PUCCH resource is a PUCCH resource that has a first PUCCH format, and the first PUCCH resource is a resource that is configured by the eNB for the UE and that is used to send the CSI. Detailed description may be referred to description of S402.

503. The UE obtains configuration information, where the configuration information is used to indicate that the UE is allowed to send the CSI and the HARQ-ACK on the first PUCCH resource that has the first PUCCH format.

When the eNB configures multiple PUCCH resources for the UE, the eNB may further set configuration information. The configuration information may indicate that the UE is allowed to send the CSI and the HARQ-ACK on the PUCCH resource that has the first PUCCH format.

504. When the UE determines that the eNB configures that a PUCCH and a PUSCH are not allowed to be sent simultaneously, or when the UE determines that the eNB configures that a PUCCH and a PUSCH are allowed to be sent simultaneously and that no PUSCH is sent in the uplink subframe, the UE sends the CSI and the HARQ-ACK on the first PUCCH resource in the uplink subframe using the first PUCCH format when the UE determines that the HARQ-ACK is the feedback information of the primary component carrier in the multiple carriers or the HARQ-ACK is the feedback information of the carriers whose quantity is not greater than the preset quantity in the multiple carriers.

Before sending the CSI and the HARQ-ACK on the PUCCH resource in the uplink subframe using the first PUCCH format, the UE may need to determine whether the eNB configures that the UE is allowed to send a PUCCH and a PUSCH simultaneously or is not allowed to send a PUCCH and a PUSCH simultaneously. If the eNB configures that the UE is allowed to send a PUCCH and a PUSCH simultaneously and there is a PUSCH to be sent in the uplink subframe, the UE may send the CSI on the PUSCH to be sent, and simultaneously send the HARQ-ACK feedback information of the primary component carrier on a resource that is used to send the HARQ-ACK and that corresponds to a sending location of scheduling information. The scheduling information is sent by the eNB to the UE for scheduling data of the primary component carrier. Alternatively, the UE may send the CSI on the PUSCH to be sent, and simultaneously send the HARQ-ACK feedback information of the carriers whose quantity is not greater than the preset quantity in the multiple carriers, on a resource that is preconfigured by the eNB for the UE and that is used to send the HARQ-ACK feedback information of the carriers whose quantity is not greater than the preset quantity in the multiple carriers. If the eNB configures that a PUCCH and a PUSCH are not allowed to be sent simultaneously, or the UE determines that the eNB configures that a PUCCH and a PUSCH are allowed to be sent simultaneously and the UE determines that no PUSCH is sent in the uplink subframe, the UE sends the CSI and the HARQ-ACK on the PUCCH resource in the uplink subframe using the first PUCCH format. Detailed description may be referred to the description of S403 about sending, by the UE, the CSI and the HARQ-ACK on the first PUCCH resource in the uplink subframe using the first PUCCH format when the UE determines that the HARQ-ACK is the feedback information of the primary component carrier in the multiple carriers or the HARQ-ACK is the feedback information of the carriers whose quantity is not greater than the preset quantity in the multiple carriers.

505. When the UE sends the CSI and the HARQ-ACK on the PUCCH resource in the uplink subframe using the first PUCCH format, the UE determines a quantity of bits occupied by the CSI to be sent in the uplink subframe, a quantity of bits occupied by the HARQ-ACK to be sent in the uplink subframe, and a capacity $M_a$ of the PUCCH resource; and determines that a sum $M_1$ of the quantity of bits occupied by the CSI and the quantity of bits occupied by the HARQ-ACK is greater than the capacity $M_a$ of the PUCCH, and discards $M_2$ bits of CSI that has a low priority, where $M_2$ satisfies $M_1-M_2 \leq M_a$.

Detailed description of step 505 may be referred to the description about sending CSI and SR by a UE in S205, and details are not described herein again.

In this embodiment of the present invention, the UE obtains the configuration information. The configuration information is used to indicate that the UE satisfies a condition of sending the CSI and the HARQ-ACK on the first PUCCH resource that has the first PUCCH format. In this way, the UE can determine, according to the configuration information, the PUCCH resource that has the first PUCCH format and that can be used, so that the UE can send the CSI and the HARQ-ACK to the eNB. When the sum of the quantity of bits occupied by the CSI and the quantity of bits occupied by the HARQ-ACK is greater than the capacity of the PUCCH, the UE may discard a part of CSI having a low priority. This ensures that the UE can send periodic CSI information as much as possible, and improves accuracy of resource scheduling by the eNB for the UE.

Figure 12:
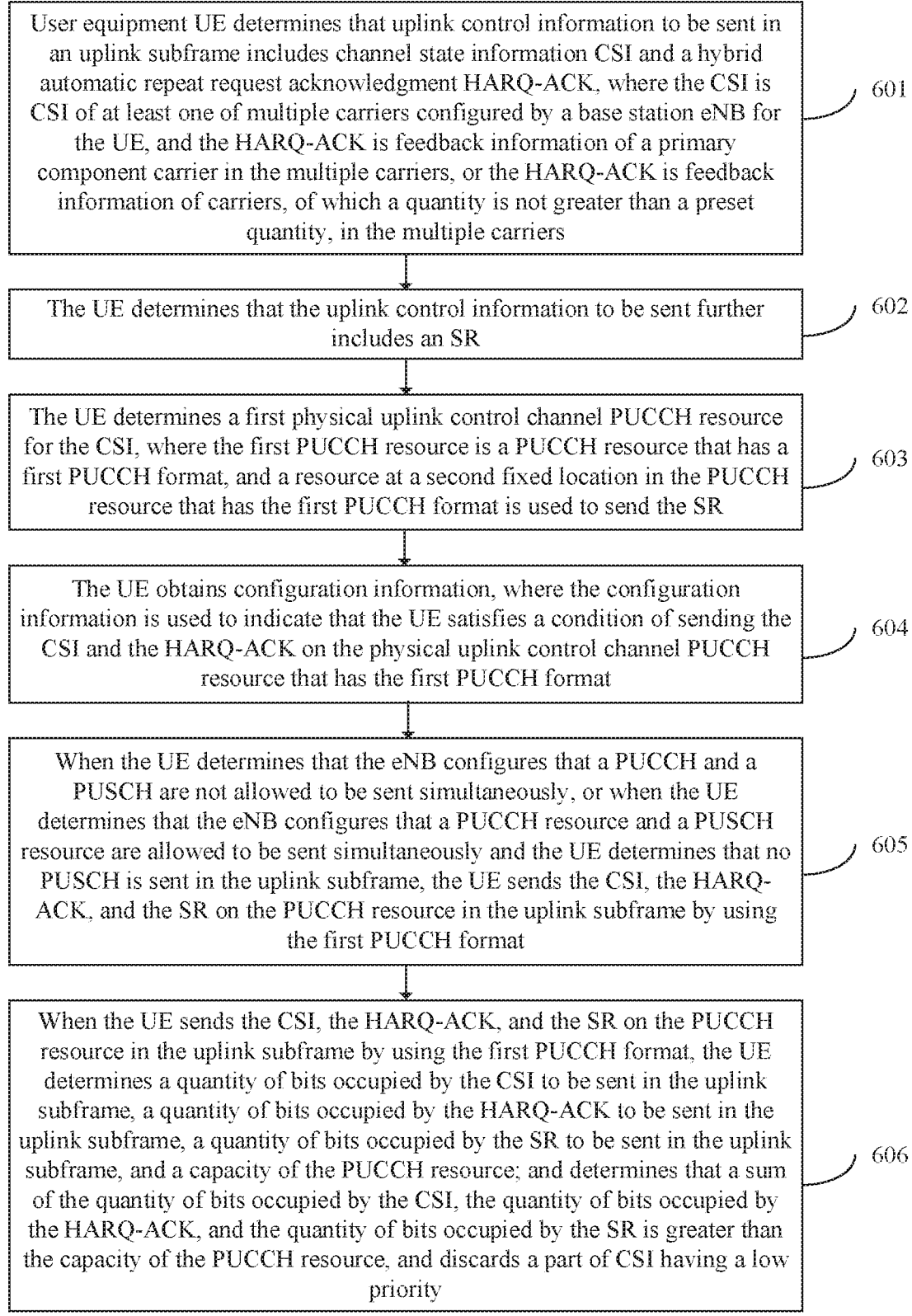
FIG. 12 is a schematic diagram of yet another uplink control information sending method according to an embodiment of the present invention.

As described in the foregoing embodiment, the UE sends, to the eNB on a same PUCCH resource in a same uplink subframe, the CSI and the HARQ-ACK information of the primary component carrier in the multiple carriers or the carriers whose quantity is not greater than the preset quantity in the multiple carriers. In actual application, when the UE determines that the uplink control information to be sent in the uplink subframe further includes an SR, the UE may simultaneously send, on the same PUCCH resource in the same uplink subframe, the SR, the CSI, and the HARQ-ACK of the primary component carrier in the multiple carriers or the carriers whose quantity is not greater than the preset quantity in the multiple carriers. Details are described below. Referring to FIG. 12, another embodiment of an uplink control information sending method includes the following steps.

601. A UE determines that uplink control information to be sent in an uplink subframe includes channel state information (CSI) and a hybrid automatic repeat request acknowledgment (HARQ-ACK), where the CSI is CSI of at least one of multiple carriers configured by a base station (e.g., an eNB) for the UE, and the HARQ-ACK is feedback information of a primary component carrier in the multiple carriers, or the HARQ-ACK is feedback information of carriers whose quantity is not greater than a preset quantity in the multiple carriers. Details may be referred to the description of S401.

602. The UE determines that the uplink control information to be sent further includes an SR. Details may be referred to the description of S202.

603. The UE determines a first physical uplink control channel (PUCCH) resource for the CSI, where the first PUCCH resource is a PUCCH resource that has a first PUCCH format, and a resource at a second fixed location in the PUCCH resource that has the first PUCCH format is used to send the SR.

Detailed description about the resource, at the second fixed location in the PUCCH resource that has the first PUCCH format, used to send the SR may be referred back to the description in S203, which discloses that the resource at the fixed location in the PUCCH resource that has the first PUCCH format is used to send the SR, and thus is not described herein again.

604. The UE obtains configuration information, where the configuration information is used to indicate that the UE satisfies a condition of sending the CSI and the HARQ-ACK on the PUCCH resource that has the first PUCCH format. Detailed description may be referred to the description of S503.

605. When the UE determines that the eNB configures that a PUCCH and a PUSCH are not allowed to be sent simultaneously, or when the UE determines that the eNB configures that a PUCCH resource and a PUSCH resource are allowed to be sent simultaneously and that no PUSCH is sent in the uplink subframe, the UE sends the CSI, the HARQ-ACK, and the SR on the PUCCH resource in the uplink subframe using the first PUCCH format.

Detailed description may be referred to the description in S504 about sending CSI and HARQ by a UE, and is not described herein again.

606. When the UE sends the CSI, the HARQ-ACK, and the SR on the PUCCH resource in the uplink subframe using the first PUCCH format, the UE determines a quantity of bits occupied by the CSI to be sent in the uplink subframe, a quantity of bits occupied by the HARQ-ACK to be sent in the uplink subframe, a quantity of bits occupied by the SR to be sent in the uplink subframe, and a capacity $Y_a$ of the PUCCH resource, and determines that a sum $Y_1$ of the quantity of bits occupied by the CSI, the quantity of bits occupied by the HARQ-ACK, and the quantity of bits occupied by the SR is greater than the capacity $Y_a$ of the PUCCH resource, and discards $Y_2$ bits of CSI that has a low priority, where $Y_2$ satisfies $Y_1-Y_2 \leq Y_a$.

Detailed description may be referred to the description in S205 about sending CSI and SR by a UE, and is not described herein again.

In this embodiment of the present invention, when the UE determines that the uplink control information to be sent further includes the SR, the UE determines the PUCCH resource that has the first PUCCH format. The second fixed location may be set in the PUCCH resource to send the SR. This ensures that the UE can send the SR to the eNB. Because the HARQ-ACK and the CSI can also be sent on the PUCCH resource that has the first PUCCH format, the UE sends the SR, HARQ-ACK, and the CSI on a same PUCCH resource in a same uplink subframe to the eNB. This improves efficiency of data exchange between the eNB and the UE, and also improves accuracy of resource scheduling by the eNB for the UE.

Figure 13:
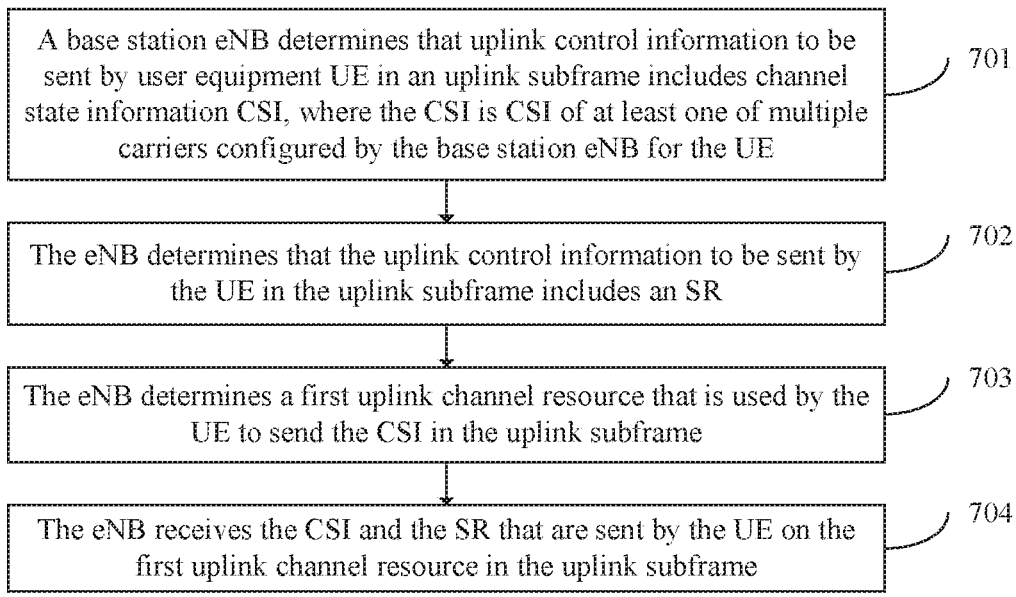
FIG. 13 is a schematic diagram of an uplink control information receiving method according to an embodiment of the present invention.

Referring to FIG. 13, an embodiment of an uplink control information receiving method includes the following steps.

701. A base station (e.g., an eNB) determines that uplink control information to be sent by a UE in an uplink subframe includes channel state information (CSI), where the CSI is CSI of at least one of multiple carriers configured by the eNB for the UE. Detailed description may be referred to the description of Slot.

702. The eNB determines that the uplink control information to be sent by the UE in the uplink subframe includes an SR. Detailed description may be referred to the description of S102.

703. The eNB determines a first uplink channel resource that is used by the UE to send the CSI in the uplink subframe. Detailed description may be referred to the description of S103.

704. The eNB receives the CSI and the SR that are sent by the UE on the first uplink channel resource in the uplink subframe. Detailed description may be referred to the description of S104.

Figure 14:
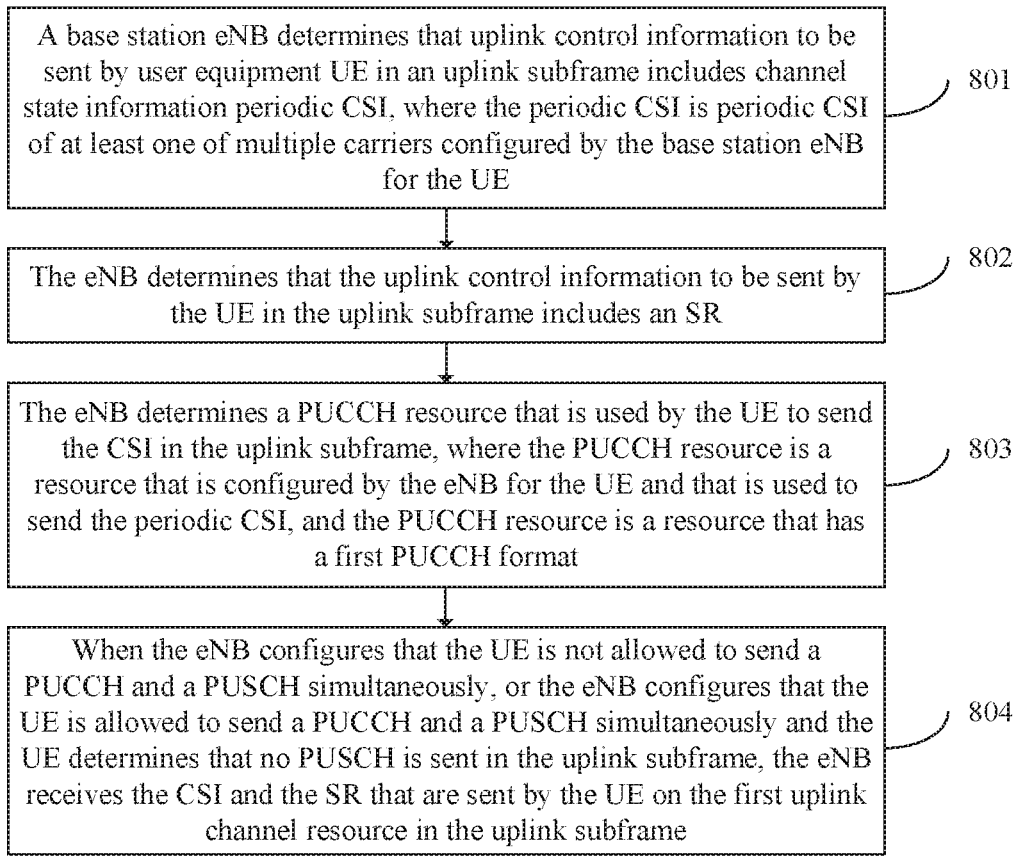
FIG. 14 is a schematic diagram of another uplink control information receiving method according to an embodiment of the present invention.

Referring to FIG. 14, another embodiment of an uplink control information receiving method includes the following steps.

801. A base station (e.g., an eNB) determines that uplink control information to be sent by a UE in an uplink subframe includes periodic channel state information (CSI), where the periodic CSI is periodic CSI of at least one of multiple carriers configured by the eNB for the UE. Detailed description may be referred to the description of S201.

802. The eNB determines that the uplink control information to be sent by the UE in the uplink subframe includes an SR. Detailed description may be referred to the description of S202.

803. The eNB determines a PUCCH resource that is used by the UE to send the CSI in the uplink subframe, where the PUCCH resource is a resource that is configured by the eNB for the UE and that is used to send the periodic CSI, and the PUCCH resource is a resource that has a first PUCCH format. Detailed description may be referred to the description of S203.

804. When the eNB configures that the UE is not allowed to send a PUCCH and a PUSCH simultaneously, or the eNB configures that the UE is allowed to send a PUCCH and a PUSCH simultaneously and the UE determines that no PUSCH is sent in the uplink subframe, the eNB receives the CSI and the SR that are sent by the UE on the first uplink channel resource in the uplink subframe. Detailed description may be referred to the description of S204.

Figure 15:
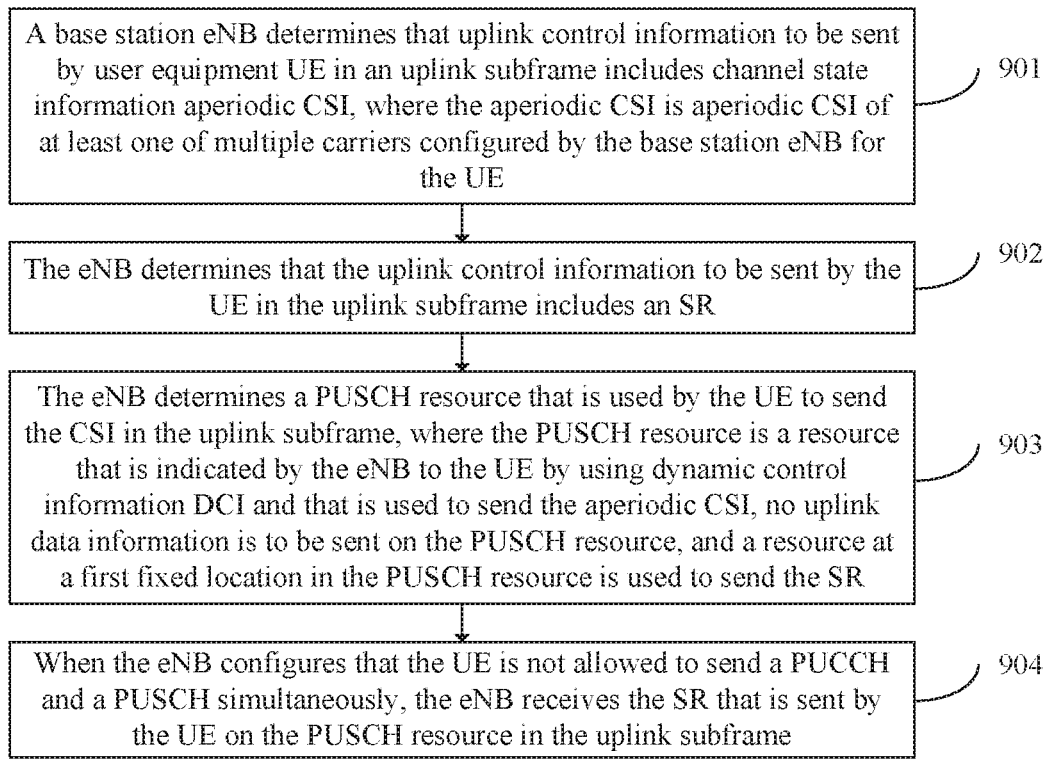
FIG. 15 is a schematic diagram of yet another uplink control information receiving method according to an embodiment of the present invention.

Referring to FIG. 15, another embodiment of an uplink control information receiving method includes the following steps.

901. A base station (e.g., an eNB) determines that uplink control information to be sent by a UE in an uplink subframe includes aperiodic channel state information (CSI), where the aperiodic CSI is aperiodic CSI of at least one of multiple carriers configured by the eNB for the UE. Detailed description may be referred to the description of S301.

902. The eNB determines that the uplink control information to be sent by the UE in the uplink subframe includes an SR. Detailed description may be referred to the description of S302.

903. The eNB determines a PUSCH resource that is used by the UE to send the CSI in the uplink subframe, where the PUSCH resource is a resource that is indicated by the eNB to the UE using dynamic control information (DCI) and that is used to send the aperiodic CSI, no uplink data information is to be sent on the PUSCH resource, and a resource at a first fixed location in the PUSCH resource is used to send the SR. Detailed description may be referred to the description of S303.

904. When the eNB configures that the UE is not allowed to send a PUCCH and a PUSCH simultaneously, the eNB receives the SR that is sent by the UE on the PUSCH resource in the uplink subframe. Detailed description may be referred to the description of S304.

Figure 16:
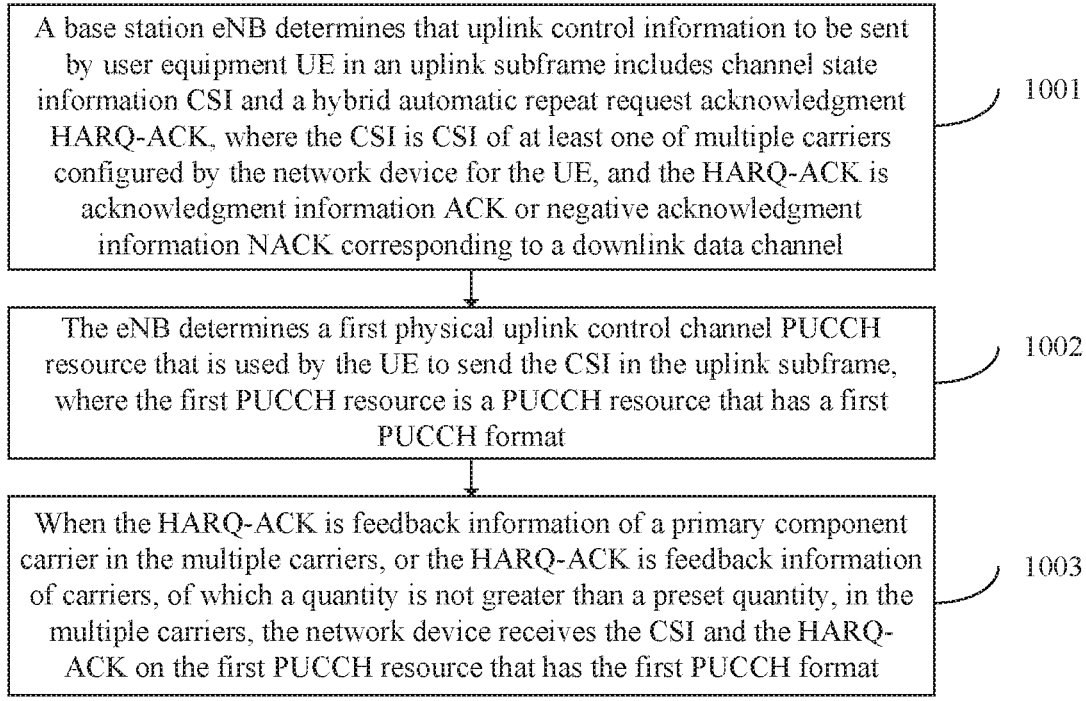
FIG. 16 is a schematic diagram of yet another uplink control information receiving method according to an embodiment of the present invention.

Referring to FIG. 16, another embodiment of an uplink control information receiving method includes the following steps.

1001. A base station (e.g., an eNB) determines that uplink control information to be sent by a UE in an uplink subframe includes channel state information (CSI) and a hybrid automatic repeat request acknowledgment (HARQ-ACK), where the CSI is CSI of at least one of multiple carriers configured by the network device for the UE, and the HARQ-ACK is acknowledgment information (ACK) or negative acknowledgment information (NACK) corresponding to a downlink data channel. Detailed description may be referred to the description of S401.

1002. The eNB determines a first physical uplink control channel (PUCCH) resource that is used by the UE to send the CSI in the uplink subframe, where the first PUCCH resource is a PUCCH resource that has a first PUCCH format. Detailed description may be referred to the description of S402.

1003. When the HARQ-ACK is feedback information of a primary component carrier in the multiple carriers, or the HARQ-ACK is feedback information of carriers whose quantity is not greater than a preset quantity in the multiple carriers, the network device receives the CSI and the HARQ-ACK on the first PUCCH resource that has the first PUCCH format. Detailed description may be referred to the description of S403.

Figure 17:
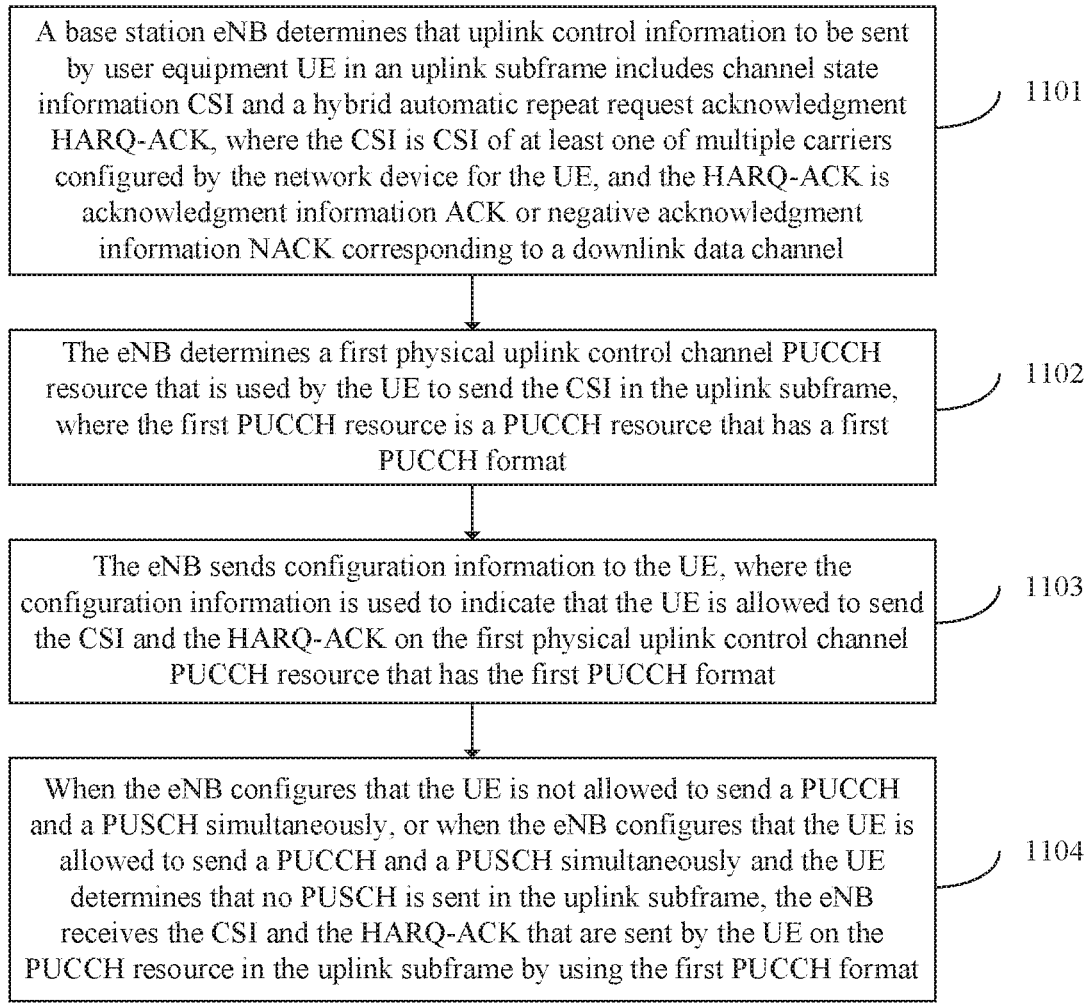
FIG. 17 is a schematic diagram of yet another uplink control information receiving method according to an embodiment of the present invention.

Referring to FIG. 17, another embodiment of an uplink control information receiving method includes the following steps.

1101. A base station (e.g., an eNB) determines that uplink control information to be sent by a UE in an uplink subframe includes channel state information (CSI) and a hybrid automatic repeat request acknowledgment (HARQ-ACK), where the CSI is CSI of at least one of multiple carriers configured by the network device for the UE, and the HARQ-ACK is acknowledgment information (ACK) or negative acknowledgment information (NACK) corresponding to a downlink data channel. Detailed description may be referred to the description of S501.

1102. The eNB determines a first physical uplink control channel (PUCCH) resource that is used by the UE to send the CSI in the uplink subframe, where the first PUCCH resource is a PUCCH resource that has a first PUCCH format. Detailed description may be referred to the description of S502.

1103. The eNB sends configuration information to the UE, where the configuration information is used to indicate that the UE is allowed to send the CSI and the HARQ-ACK on the first PUCCH resource that has the first PUCCH format. Detailed description may be referred to the description of S503.

1104. When the eNB configures that the UE is not allowed to send a PUCCH and a PUSCH simultaneously, or when the eNB configures that the UE is allowed to send a PUCCH and a PUSCH simultaneously and the UE determines that no PUSCH is sent in the uplink subframe, the eNB receives the CSI and the HARQ-ACK that are sent by the UE on the PUCCH resource in the uplink subframe using the first PUCCH format. Detailed description may be referred to the description of S504.

Figure 18:
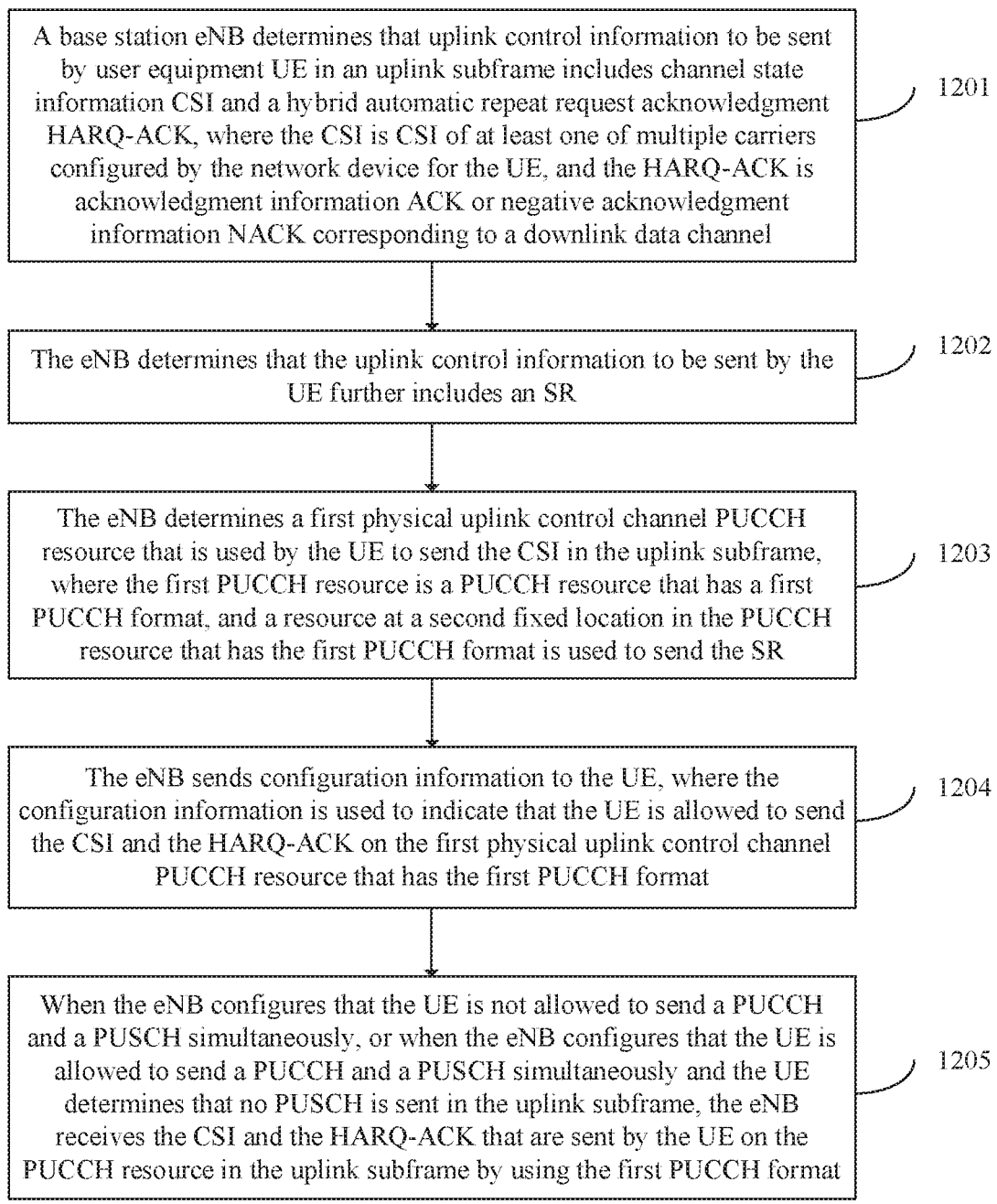
FIG. 18 is a schematic diagram of yet another uplink control information receiving method according to an embodiment of the present invention.

Referring to FIG. 18, another embodiment of an uplink control information receiving method includes the following steps.

1201. A base station (e.g., an eNB) determines that uplink control information to be sent by a UE in an uplink subframe includes channel state information (CSI) and a hybrid automatic repeat request acknowledgment (HARQ-ACK), where the CSI is CSI of at least one of multiple carriers configured by the network device for the UE, and the HARQ-ACK is acknowledgment information (ACK) or negative acknowledgment information (NACK) corresponding to a downlink data channel. Detailed description may be referred to the description of S601.

1202. The eNB determines that the uplink control information to be sent by the UE further includes an SR. Detailed description may be referred to the description of S602.

1203. The eNB determines a first physical uplink control channel (PUCCH) resource that is used by the UE to send the CSI in the uplink subframe, where the first PUCCH resource is a PUCCH resource that has a first PUCCH format, and a resource at a second fixed location in the PUCCH resource that has the first PUCCH format is used to send the SR. Detailed description may be referred to the description of S603.

1204. The eNB sends configuration information to the UE, where the configuration information is used to indicate that the UE is allowed to send the CSI and the HARQ-ACK on the first PUCCH resource that has the first PUCCH format. Detailed description may be referred to the description of S604.

1205. When the eNB configures that the UE is not allowed to send a PUCCH and a PUSCH simultaneously, or when the eNB configures that the UE is allowed to send a PUCCH and a PUSCH simultaneously and the UE determines that no PUSCH is sent in the uplink subframe, the eNB receives the CSI and the HARQ-ACK that are sent by the UE on the PUCCH resource in the uplink subframe using the first PUCCH format. Detailed description may be referred to the description of S605.

It should be noted that, devices used in the specification to describe the solutions of the present invention include a base station (e.g., an eNB) and a UE. In an actual case, however, the solutions of the present invention may also be applicable to other devices in a same network. For example, the base station may be replaced with an access point device on a network side, and details are not described herein.

The foregoing embodiments are merely intended for describing the technical solutions of embodiments of the present invention, but not for limiting the present invention. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An apparatus, comprising:
   at least one processor; and
   a non-transitory computer-readable storage medium storing a program to be executed by the at least one processor, the program including instructions to:
   determine that uplink control information to be sent to an eNB in an uplink subframe comprises channel state information (CSI) and a scheduling request (SR), wherein the CSI corresponds to at least one carrier of a plurality of carriers configured by the eNB for the apparatus to communicate with the eNB, and the SR requests for an uplink transmission resource, wherein the uplink subframe comprises two slots and each of the two slots comprises seven time domain symbols;
   determine a first uplink channel resource in the uplink subframe for transmitting the CSI, wherein the first uplink channel resource is configured by the eNB for the apparatus to send the CSI and the first uplink channel resource occupies N resource blocks, N≥1;
   when the first uplink channel resource is a physical uplink control channel (PUCCH) resource that has a first PUCCH format, send the CSI and the SR to the eNB on the first uplink channel resource in the uplink subframe using the first PUCCH format, wherein for the first PUCCH format, a fourth time domain symbol of each of the two slots carry a demodulation reference signal and a first, a second, a third, a fifth, a sixth, and a seventh time domain symbol of each of the two slots carry the CSI and the SR; and
   when the first uplink channel resource is a PUCCH resource that has a second PUCCH format different than the first PUCCH format, send the SR to the eNB on a second uplink channel resource in the uplink subframe without sending the CSI to the eNB, wherein the second uplink channel resource is configured for the apparatus to send the SR to the eNB.

2. The apparatus according to claim 1, wherein the CSI is periodic CSI.

3. The apparatus according to claim 2, wherein the first PUCCH format specifies an amount of control information allowed in a PUCCH of a subframe, the amount being greater than 11 bits.

4. The apparatus according to claim 1, wherein the first PUCCH format is encoded using a convolutional code.

5. The apparatus according to claim 1, wherein N>1.

6. An eNB, comprising:
   at least one processor; and
   a non-transitory computer-readable storage medium storing a program to be executed by the at least one processor, the program including instructions to:
   determine that uplink control information to be sent by a user equipment to the eNB in an uplink subframe comprises channel state information (CSI) and a scheduling request (SR), wherein the CSI corresponds to at least one carrier of a plurality of carriers configured by the eNB for communications between the eNB and the user equipment, wherein the uplink subframe comprises two slots and each of the two slots comprises seven time domain symbols;
   determine a first uplink channel resource for the user equipment to send the CSI to the eNB in the uplink subframe, wherein the first uplink channel resource occupies N resource blocks, N≥1;
   when the first uplink channel resource is a PUCCH resource that has a first PUCCH format, receive the CSI and the SR from the use equipment on the first uplink channel resource in the uplink subframe, wherein for the first PUCCH format, a fourth time domain symbol of each of the two slots carry a demodulation reference signal and a first, a second, a third, a fifth, a sixth, and a seventh time domain symbol of each of the two slots carry the CSI and the SR; and
   when the first uplink channel resource is a PUCCH resource that has a second PUCCH format different than the first PUCCH format, receive the SR from the use equipment on a second uplink channel resource in the uplink subframe without receiving the CSI from the use equipment, wherein the second uplink channel resource is configured by the eNB for the user equipment to send the SR to the eNB.

7. The eNB according to claim 6, wherein the CSI is periodic CSI.

8. The eNB according to claim 7, wherein the first PUCCH format specifies an amount of control information allowed in a PUCCH of a subframe, the amount being greater than 11 bits.

9. The eNB according to claim 6, wherein the first PUCCH format is encoded using a convolutional code.

10. The eNB according to claim 6, wherein N>1.

11. A method, comprising:
    determining, by a user equipment, that uplink control information to be sent to an eNB in an uplink subframe comprises channel state information (CSI) and a scheduling request (SR), wherein the CSI corresponds to at least one carrier of a plurality of carriers configured by the eNB for communications between the user equipment and the eNB, and SR requests for an uplink transmission resource, wherein the uplink subframe comprises two slots and each of the two slots comprises seven time domain symbols;
    determining, by the user equipment, a first uplink channel resource in the uplink subframe for transmitting the CSI, wherein the first uplink channel resource is configured by the eNB for the user equipment to send the CSI and the first uplink channel resource occupies N resource blocks, N≥1;
    sending, by the user equipment when the first uplink channel resource is a PUCCH resource that has a first PUCCH format, the CSI and the SR to the eNB on the first uplink channel resource in the uplink subframe using the first PUCCH format, wherein for the first PUCCH format, a fourth time domain symbol of each of the two slots carry a demodulation reference signal and a first, a second, a third, a fifth, a sixth, and a seventh time domain symbol of each of the two slots carry the CSI and the SR; and
    sending, by the user equipment when the first uplink channel resource is a PUCCH resource that has a second PUCCH format different than the first PUCCH format, the SR to the eNB on a second uplink channel resource in the uplink subframe without sending the CSI to the eNB, wherein the second uplink channel resource is configured for the user equipment to send the SR to the eNB.

12. The method according to claim 11, wherein the CSI is periodic CSI.

13. The method according to claim 12, wherein the first PUCCH format specifies an amount of control information allowed in a PUCCH of a subframe, the amount being greater than 11 bits.

14. The method according to claim 11, wherein the first PUCCH format is encoded using a convolutional code.

15. The method according to claim 11, wherein N>1.

16. A method, comprising:
determining, by an eNB, that uplink control information to be sent by a user equipment to the eNB in an uplink subframe comprises channel state information (CSI) and a scheduling request (SR), wherein the CSI corresponds to at least one carrier of a plurality of carriers configured by the eNB for communications between the user equipment and the eNB, wherein the uplink subframe comprises two slots and each of the two slots comprises seven time domain symbols;

determining, by the eNB, a first uplink channel resource for the user equipment to send the CSI to the eNB in the uplink subframe, wherein the first uplink channel resource occupies N resource blocks, N≥1;

receiving, by the eNB when the first uplink channel resource is a PUCCH resource that has a first PUCCH format, the CSI and the SR on the first uplink channel resource in the uplink subframe, wherein for the first PUCCH format, a fourth time domain symbol of each of the two slots carry a demodulation reference signal and a first, a second, a third, a fifth, a sixth, and a seventh time domain symbol of each of the two slots carry the CSI and the SR; and receiving, by the eNB when the first uplink channel resource is a PUCCH resource that has a second PUCCH format different than the first PUCCH format, the SR from the user equipment on a second uplink channel resource in the uplink subframe without receiving the CSI from the user equipment, wherein the second uplink channel resource is configured for the user equipment to send the SR to the eNB.

17. The method according to claim 16, wherein the CSI is periodic CSI.

18. The method according to claim 17, wherein the first PUCCH format specifies an amount of control information allowed in a PUCCH of a subframe, the amount being greater than 11 bits.

19. The method according to claim 16, wherein the first PUCCH format is encoded using a convolutional code.

20. The method according to claim 16, wherein N>1.

* * * * *